(12) United States Patent
Burke

(10) Patent No.: US 12,370,568 B2
(45) Date of Patent: Jul. 29, 2025

(54) PORTABLE MISTER DEVICE ASSEMBLY KIT

(71) Applicant: J. W. Burke & Company, New York, NY (US)

(72) Inventor: Jonathan W. Burke, New York, NY (US)

(*) Notice: Subject to any disclaimer, the term of this patent is extended or adjusted under 35 U.S.C. 154(b) by 281 days.

(21) Appl. No.: 17/549,647

(22) Filed: Dec. 13, 2021

(65) Prior Publication Data

US 2022/0379334 A1 Dec. 1, 2022

Related U.S. Application Data

(60) Provisional application No. 63/125,529, filed on Dec. 15, 2020.

(51) Int. Cl.
| | | |
|---|---|---|
| *B05B 15/625* | (2018.01) | |
| *B05B 1/02* | (2006.01) | |
| *B05B 1/20* | (2006.01) | |

(52) U.S. Cl.
CPC .............. *B05B 15/625* (2018.02); *B05B 1/02* (2013.01); *B05B 1/20* (2013.01)

(58) Field of Classification Search
CPC ............ B05B 15/625; B05B 1/02; B05B 1/20
USPC ..... 239/273, 280, 280.5, 281, 289, 275, 279
See application file for complete search history.

(56) References Cited

U.S. PATENT DOCUMENTS

| | | | |
|---|---|---|---|
| 2,631,062 A | | 3/1953 | Tiedemann |
| 2,727,366 A | | 12/1955 | Hagen |
| 5,143,107 A | | 9/1992 | Kelley |
| 5,273,214 A | * | 12/1993 | Huffstutler ............ B05B 15/628 |
| | | | 239/279 |
| 5,649,867 A | * | 7/1997 | Briggs ..................... A63B 9/00 |
| | | | 472/128 |
| 5,934,563 A | * | 8/1999 | Gapco ........................ B05B 3/06 |
| | | | 239/279 |
| 5,979,793 A | * | 11/1999 | Louis ..................... F24F 5/0035 |
| | | | 239/289 |
| 6,682,000 B1 | * | 1/2004 | Apple ..................... A45B 25/00 |
| | | | 239/289 |
| 7,823,800 B1 | | 11/2010 | Kalpakoff |
| 2005/0172987 A1 | | 8/2005 | Byrnes |
| 2009/0090404 A1 | | 4/2009 | Kuelbs |

FOREIGN PATENT DOCUMENTS

CN 109744128 A 5/2019

* cited by examiner

*Primary Examiner* — Steven J Ganey
(74) *Attorney, Agent, or Firm* — Foster Garvey P.C.

(57) ABSTRACT

A mister kit provides components to assemble as needed and where needed misters of customizable configurations capable of on-site assembly, connectable with local business and residential water sources, and with the ability to be secured to nearby structures.

2 Claims, 34 Drawing Sheets

PORTABLE MISTER DEVICE ASSEMBLY KIT

FIELD OF THE INVENTION

Embodiments of the invention relate generally to misters and other evaporative cooling devices.

BACKGROUND OF THE INVENTION

Many portable misters employ onboard water reservoirs, pumps, fans, and electrical power supplies to provide on-location evaporative cooling. However, these misters are complicated, inconvenient to assemble and use, and expensive to manufacture and maintain.

Other more passive misters that are designed to operate from regular residential or business public water sources are permanently or semi-permanently installed on buildings or attached to outdoor tables or shade structures. Even those passive misting systems that supposedly allow repositioning of the misting plumbing to other locations are not truly designed for or capable of rapid relocation as the connecting hardware is substantially unwieldy to disengage from structures to which they're attached. Accordingly, there is also a need to have mister configurations that can be more readily and easily deployed to a site and re-staged to another site chosen by a user.

BRIEF DESCRIPTION OF THE DRAWINGS

Preferred and alternative embodiments of the present invention are described in detail below with reference to the following drawings:

FIGS. 12A, 12B, and 12C depict a clamp securing unit presented respectively in side, front, and top views;

DETAILED DESCRIPTION OF THE PARTICULAR EMBODIMENTS

Figure 1A:
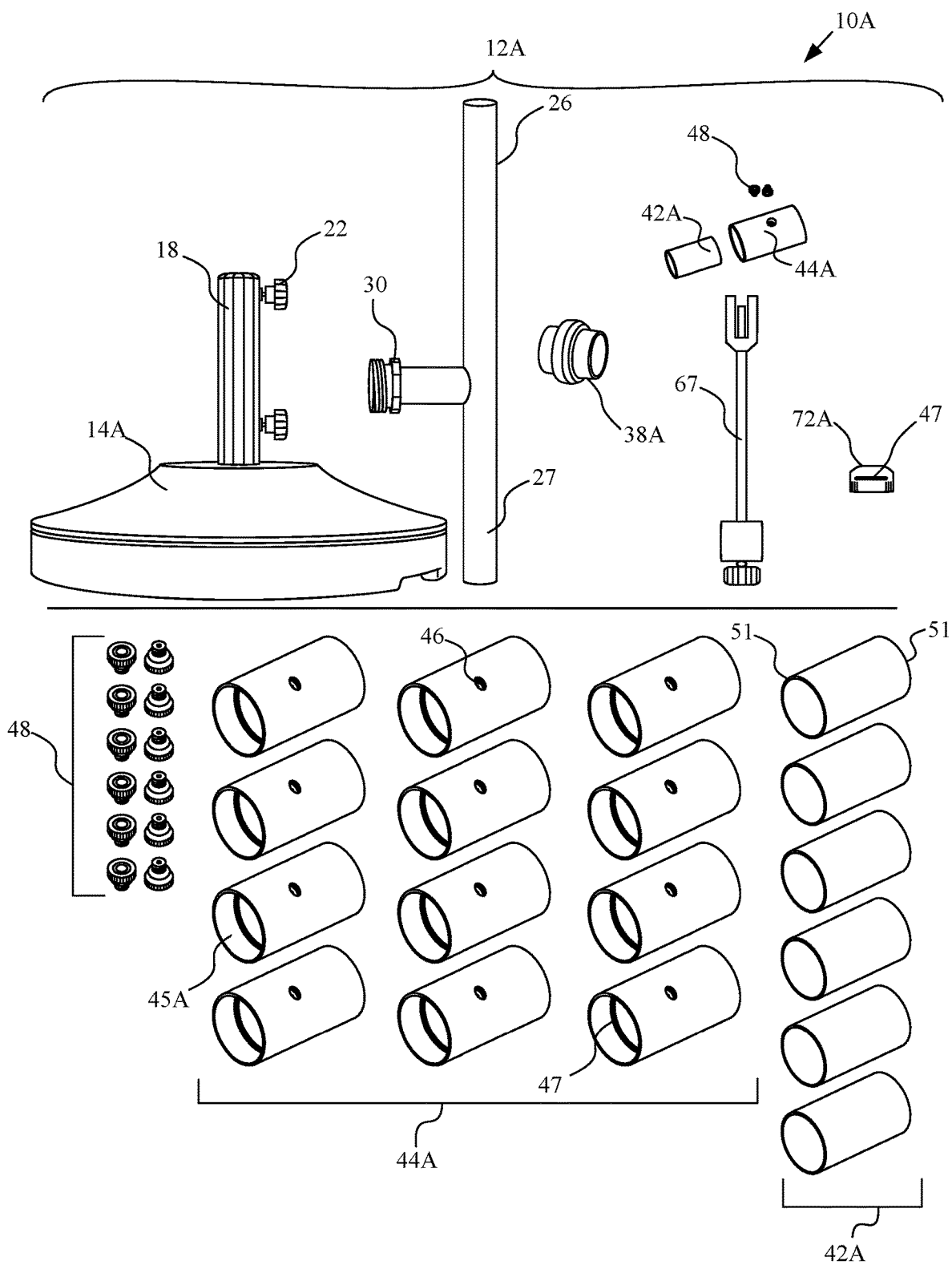
FIG. 1A depicts a first embodiment of a mister assembly kit.

Embodiments of the invention include a mister kit that provides components to assemble as-needed and where-needed misters of customizable configurations capable of simple and easy on-site assembly and movement and quickly connectable with local business and residential water sources. Certain preferred embodiments are free standing. Other embodiments have the ability to be temporarily or permanently secured to, and readily and easily detached from, nearby structures. The customizable mister configurations do not require water reservoirs, water pressurization systems, fans, or electrical power supplies. Moreover, the customizable mister configurations can be free standing when desired, or optionally secured by clamps or other devices. Such securing or clamping devices are designed for rapid engagement and rapid removal from nearby securing structures.

In a preferred embodiment a basic mister having a single nozzle and secured by a solid base is described. In another preferred embodiment a second basic mister having a single unit and secured by water-Tillable base is described. In other embodiments the basic mister units are built using slideable and press fit components, and also can be built using compatibly matched helical threads from components having internal threads that are configured to be engaged with external threads of adjacently positioned components.

In other embodiments larger mister assemblies having multiple misters are described and built up to taller free-standing structures. Alternately, the clamp securing unit may be positioned for articulation with and clamping onto nearby structures so as to minimize tilting or falling over of larger, custom assembled misters in high wind conditions, for example. Further disclosure of the various assemblies can be more readily understood with regard to the figures below.

Disclosure herein further describes a preferred embodiment for a mister kit having components to make a mister device, from basic structure to a more elaborate structure or configuration. For the basic structure the mister kit provides a base to function as a support upon which other components are added. The base may be provided in the kit, or it may be at the user's location, as a base for a patio umbrella. In that embodiment, the patio umbrella (and pole) are removed from the base and replaced with the mister device. Additional components include a hose connection component capable of securely being held within the base and presenting the hydraulically open and distal end for hydraulic connection with the proximal end of telescopic tube adjuster.

A first extension tube for hydraulic connection may be added at its proximal end with the distal end of the telescopic tube adjustor. Thereafter a nozzle tube having at least one nozzle hydraulically connectable at its proximal end with the distal end of the first extension tube may be added. Following that may be added a second extension tube having a proximate end hydraulically connectable with the distal end of the nozzle tube. Then finally the basic mister may terminate with a cap located at the distal end of the mister device via connection to the distal end of the second extension tube, whereupon connection of a water source to the hose connection component causes water to emanate as mist from the nozzles occupying the nozzle tube.

To this basic mister structure other embodiments provide for building further up more extensive configurations and different free-standing or supported connections. For example, the mister kit provides for connection of the nozzle tube with the first extension tube where the second extension tube is by slideable press fitting. Alternatively, the connection of the nozzle tube with the first extension tube and the second extension tube is by employing a fastener mesh fitting by mutual engagement of complementary threads of adjacent structures that draws them together for sealing against an internally disposed O-ring. Though the fitting may be by slideably press fitting or fastener mesh fittings, the mister kit provides for additional components to be added to make a taller, operational mister having more nozzle tubes in the form of a chain of nozzle and extension tube pairs that are inserted between the last tube extension and the terminally positioned cap. If this mister-extension tube chain is built up to a height that challenges the base's ability to adequately control tilting or tipping over of the taller-built mister and more complex mister, other preferred embodiments provide for arranging the nozzles in an off-setting pattern around the periphery of the tube, so that the forces balance to keep the mister erect. Alternatively or in addition, a clamping device can be attached to the extension tube attached to the cap for grappling to an adjacent structure. In the clamping embodiment, these adjacent structures include, for example, the pole portion of a table umbrella, a nearby shelf, or a corner of a building structure. In other embodiments the clamping device may be attached to tube extensions more internally positioned near the middle of a mister configuration. The configuration of the clamping device may also be slipped over the larger diameter nozzle tube at a position that doesn't block emerging mist sprays form the nozzle or nozzles attached to the nozzle tube.

Another preferred embodiment for a mister kit having components to make a mister device includes a base, where the base may be solid or hollow with a port to add water or granular material capable of being poured, to which a hose connection component capable of securely being held within the base and presenting a hydraulically open and distal end for connection with the proximal end of a first extension tube while maintaining hydraulic communication. Thereafter a nozzle tube having at least one nozzle hydraulically connectable with the distal end of the first extension tube, to which is then attached a second extension tube having a proximate end hydraulically connectable with the distal end of the nozzle tube. Thereafter a cap located at the distal end of the mister device via connection to the distal end of the second extension tube is attached, whereupon connection of a water source to the hose connection component causes water to emanate as mist from the nozzles occupying the nozzle tube.

As discussed above, basic mister configurations can be made larger and more complex by insertion of a series of nozzle tube-extension tube pairs to generate the desired mister size for a given location. To this expanded configuration the clamping unit can be slipped over the terminal extension tube or a more centrally located mister tube to advantageously secure to a reachable external structure.

Yet other preferred embodiments provide for a method embodiment to make a mister of a desired configuration from mister kit components that is operable from a local water source having sufficient pressure to transit internally through the custom built mister and emerges as mist from nozzles occupying a nozzle tube. The method begins with sliding a hose connection component into a tube secured to a base, then securing the proximal end of a first extension tube to the distal end of the hose connection component, the distal end of the hose connection and the proximal end of the first extension tube being in hydraulic communication with the water source. Thereafter, connecting at least one nozzle to a nozzle tube having a complementary cavity in hydraulic communication with the water source to secure the at least one nozzle to the nozzle tube, followed by connecting the proximal end of the nozzle tube to the distal end of the first extension tube, then connecting the proximal end of a second tube extension to the distal end of the nozzle tube. Finally, a connecting a cap may be affixed to the distal end of the second extension tube. Upon attaching the water source to the proximal end of the hose connection component, water flowing from the hose emanates as water mist from the one or more misting nozzles.

Embodiments described herein further provide for a method for adapting an umbrella stand by a user into a mister device where the user slides a hose connection into a tube for secure holding by a mister base, then adding or installing a chain of nozzle-extension tube pairs that are connected to establish and maintain hydraulic communication with the hose connection component. Then, at the last extension tube of the chain, hydraulic communication is blocked by affixing a mister cap to the last extension tube. At this point the user decides, depending on the length of chain of nozzle tube-extension tube pairs, how many clamping stabilizer units, if any, to engage with any adjacent support structure. This optional engagement of the at least one clamping stabilizer is temporary as the clamping stabilizer is designed for quick attachment and quick release to the umbrella stand pole.

Embodiments of the method just described also include nozzle tubes having at least two misters that are diametrically located to provide opposingly direct mist sprays having substantially equal action-reaction forces to provide needed stability without the need of clamps or any other attachment to any other structure.

The disclosure for the preferred embodiment is more readily understood with reference to the figures discussed below.

FIG. 1A depicts a first embodiment of a mister assembly kit 10A. Kit 10A includes components 12A comprising a solid base 14A with tube holder 18 and securing knobs 22, a hose receiver 26 with a lower leg 27 sealed at its bottom to not permit water flow. The lower leg 27 configured to fit inside the hollow tube 18 of the base 14A. The hose receiver 26 includes hose attachment 30 with threads to mate with a hose fitting. Kit 10A also includes a smooth connector 38A for fitting inside the upper tube portion of hose receiver 26, an extension tube 42A fittable within the upper portion of the hose receiver 26, a nozzle tube 44A with nozzle receiving cavity 46 having helical threads on its walls, a nozzle 48 having helical threads configured to match and securely engage with the complementary shaped threads occupying the walls of receiving cavity 46, a clamp securing unit 67, and end cap 72A. Nozzle tube 44A in configured with press fit connection with its proximal end (the end first receiving hydraulic communication) and distal end (the end downstream from the proximal end of nozzle tube 44A) along its internal surface 45A to the respective ends 51 of tube extensions 42A that make press fit contact against nozzle tube's 44A O-rings 49. That is the distal end of a first tube extension slid ably press fits inside the proximal end of nozzle tube 44A, and the proximal end of a second extension tube (downstream from the first extension tube) slideably press fits inside the distal end of the nozzle tube 44A. Also configured for slideably press fitting includes the mister cap 72A with the tube extension 42A where its distal end 51 is brought into press fit contact with mister cap's 72A internally located O-ring 47.

Additional disclosure of the configuration of the nozzle tube 44A is described in FIGS. 3A and 3B below. As shown in FIG. 1A, mister kit 10A contains 12 nozzles 24, 12 nozzle tubes 44A, and six tube extensions 42A. Other arrangements for the mister kit 10A are possible with different distributions and numbers of all components mentioned, including nozzles 48, nozzle tubes 44A, and tube extensions 42A.

Components such as the nozzle tube 44A and extension tube 42A may be constructed having different lengths to accommodate different inter-nozzle 48 distances so that more closely spaced or farther spaced nozzles 48 may be configured. This ability to custom configure a misting stand on demand results in many different misting stand arrangements regarding the number and spacing of nozzles 48 within a given misting stand configuration.

The plastic material employed in any misting stand configuration may include Schedule 40 PVC polyvinyl chloride material upon which acetone based or other sealing solvents or PVC cements may be used to seal together extension tube 42A and nozzle tube 44A and other compatibly sized components to affect a permanent seal. The PVC cement may be dyed or clear. Alternatively, any other tubing material such as ABS may be used.

Figure 1B:
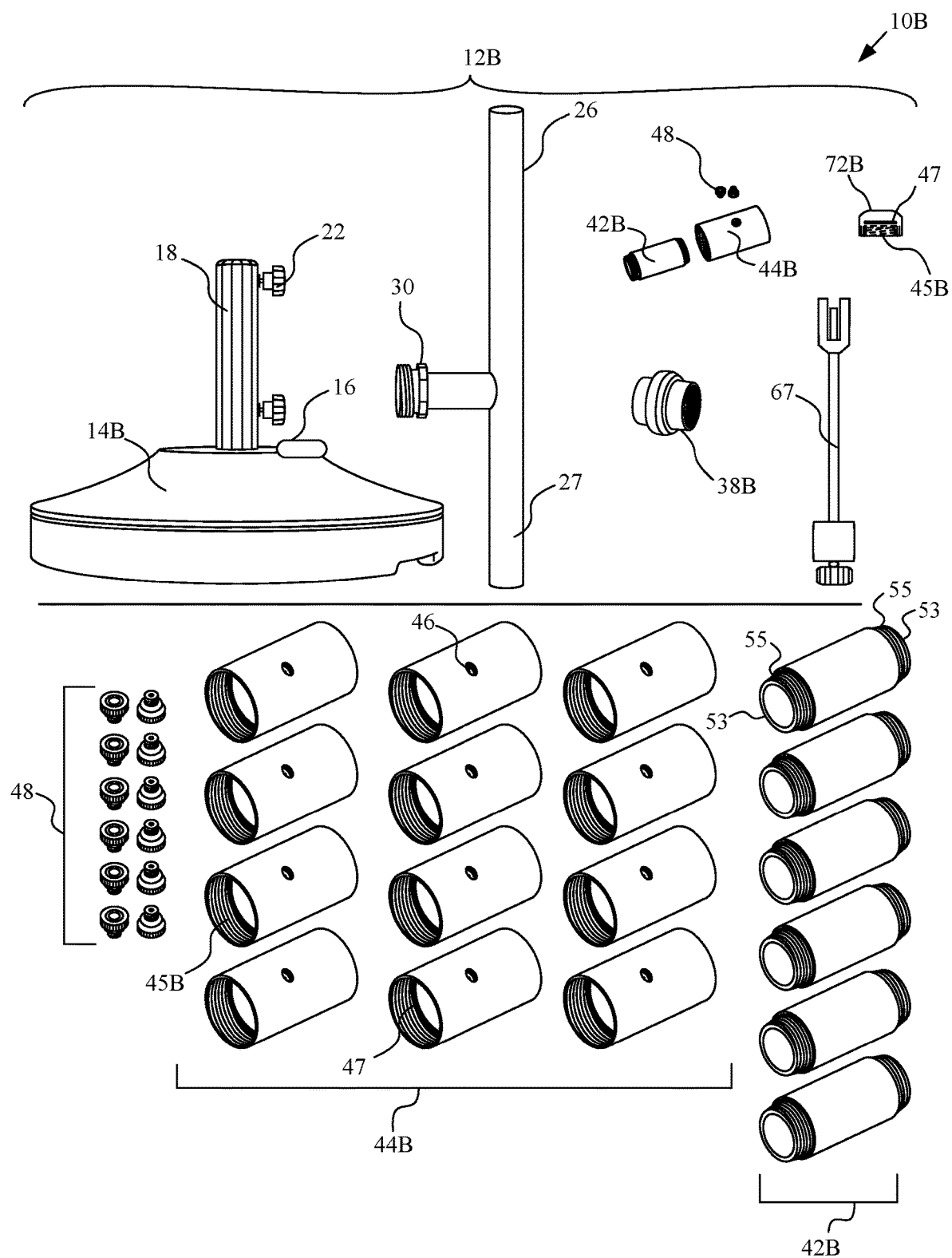
FIG. 1B depicts a second embodiment of a mister assembly kit.

FIG. 1B depicts a second embodiment of a mister assembly kit 10B. Kit 10B includes components 12B comprising a water Tillable base 14B with water access port 16, tube holder 18 and securing knobs 22. A hose receiver 26 with a lower leg 27 sealed at its bottom to not permit water flow is placed inside the hollow tube 18 of the base 14A. The hose receiver 26 includes hose attachment 30 with threads to mate with a hose fitting. Kit 10B also includes a helical grooved connector 38B for fitting inside the upper tube portion of hose receiver 26, an extension tube 42B fittable within the upper portion of the hose receiver 26 or the telescopic adjuster 38, a nozzle tube 44B with nozzle receiving cavity 46 having helical threads on its walls, a nozzle 48 having helical threads configured to match and securely engage with the complementary shaped threads occupying the walls of receiving cavity 46, a clamp securing unit 67, and end cap 72B having helical threads to engage with the helical threads of extension tube 42B. The proximal and distal ends of nozzle tube 44B is configured with internal helical threads for fastener-like connection with its proximal end (the end first receiving hydraulic communication) and distal end (the end downstream from the proximal end of nozzle tube 44B) for respective meshing with the external threads occupying the ends of extension tubes 42B. Extension tubes 42B's helical spirals along its proximal and distal ends provide for fastener-like nut-and-bolt connection with the distal end of a first extension tube's external helical threads mesh fits inside the proximal end's internal helical threads of nozzle tube 44B, and the proximal end of a second extension tube's (downstream from the first extension tube) helically meshes inside and with the internal helical threads of the distal end of the nozzle tube 44B. Also configured for helical thread to helical thread fastener-like connection includes the mister cap 72B with its internal threads 45B meshing with the distal end of a terminal extension tube's 42B external threads and through helical thread meshing draws the extension tube's 42B distal end 53 in sealing contact with mister cap's 72B internally located O-ring 47.

Additional disclosure of the configuration of the nozzle tube 44B is described in FIGS. 4A and 4B below. As shown in FIG. 1B, mister kit 10B contains 12 nozzles 48, 12 nozzle tubes 44B, and six extension tubes 42B. Other arrangements for the mister kit 10B are possible with different distributions and numbers of all components mentioned, including nozzles 48, nozzle tubes 44B, and tube extensions 42B.

Figure 2:
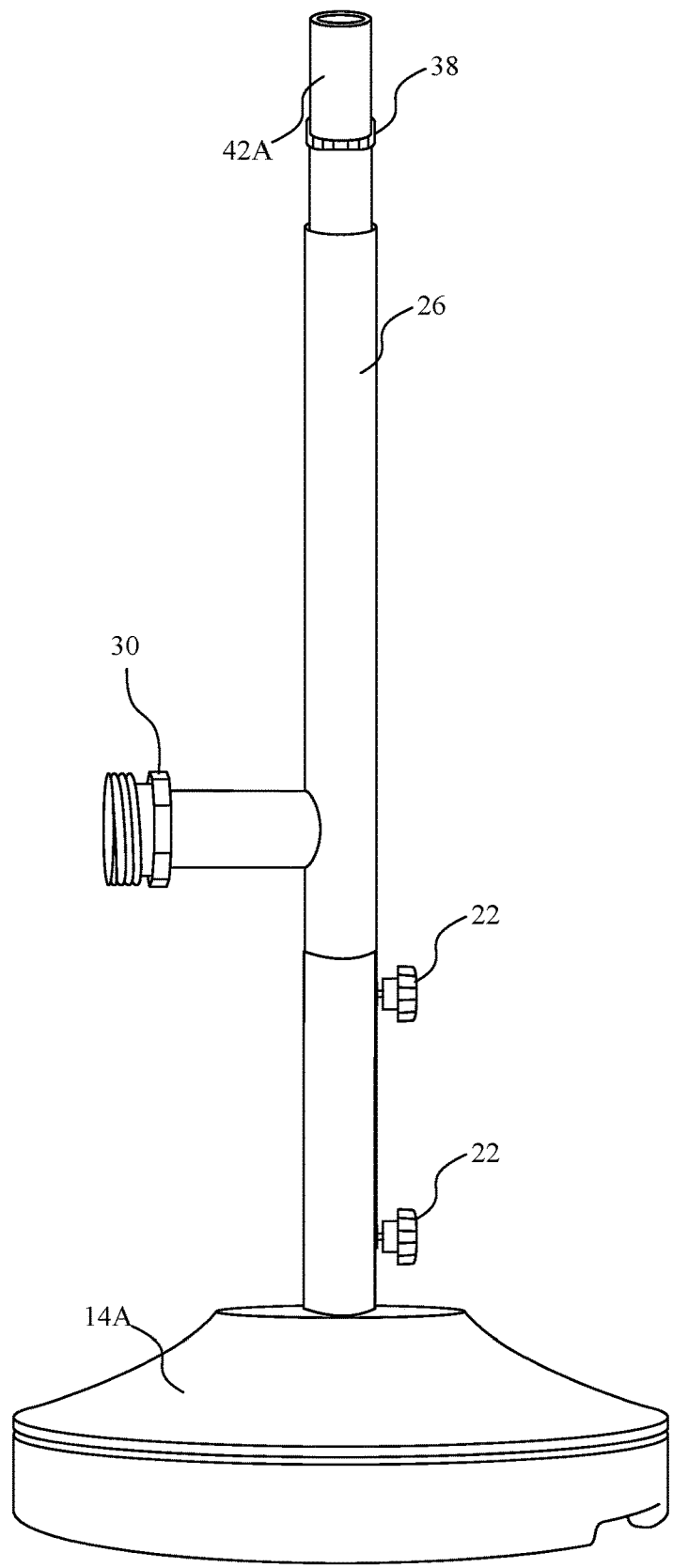
FIG. 2 depicts a lower assembly of a mister configuration from a solid base and other components depicted in the first embodiment of the mister assembly kit depicted in FIG. 1A.

FIG. 2 depicts a lower assembly of a mister configuration from a solid base 14A and other components depicted in the first embodiment of the mister assembly kit 10A depicted in FIG. 1A. In this arrangement the lower portion of the mister depicts the hydraulically blocked end of hose receiver 26 placed inside tube holder 18 and secured by knobs 22. The proximal end of telescopic adjuster 38 connects with the hydraulically-open and distal end of the hose receiver 26. Also shown is extension tube 42A in hydraulic connection with the telescopic adjuster 38.

Figure 3A:
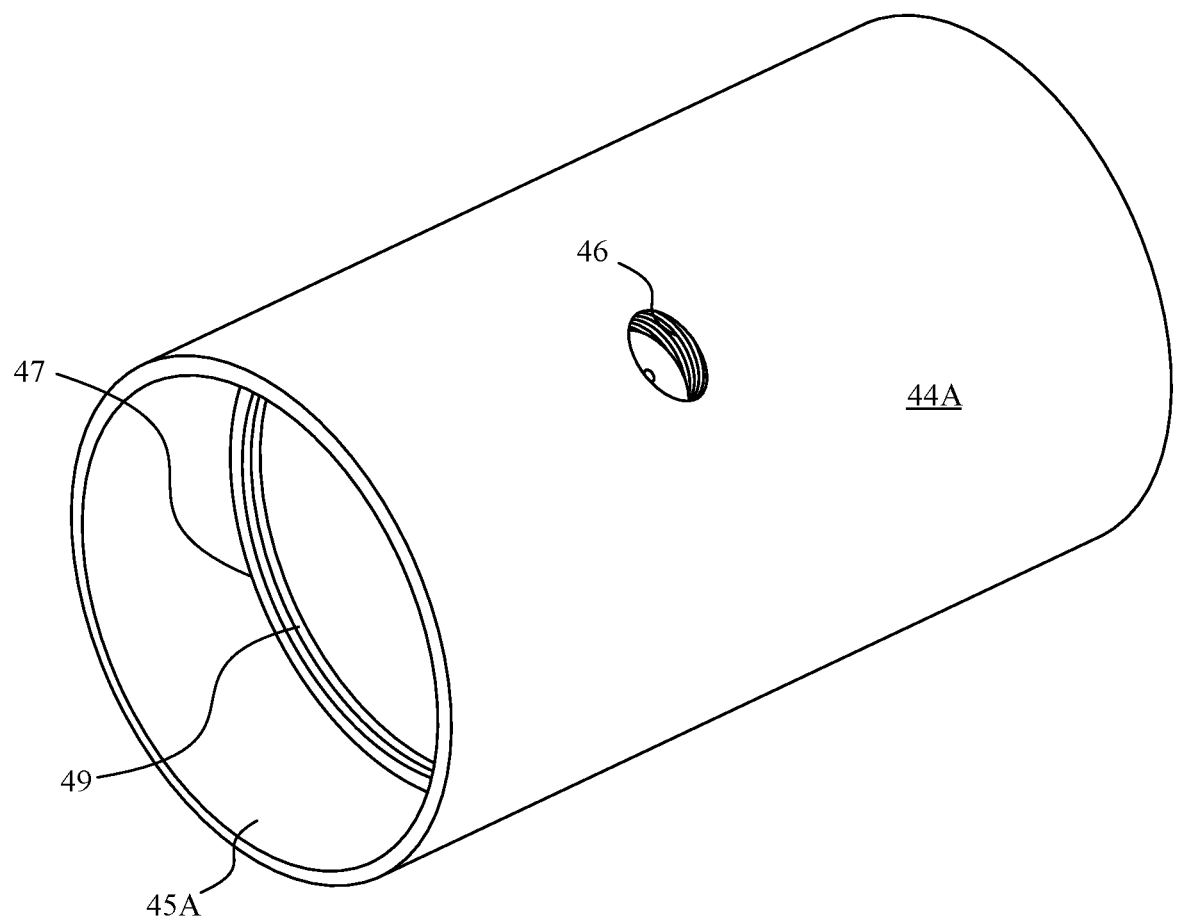
FIG. 3A depicts a mister nozzle tube configured for press fit connection to other components.

FIG. 3A depicts a mister nozzle tube 44A configured for press fit connection to other components, with or without adhesive. The walls of the nozzle receiver cavity 46 are helically configured to mesh engage with compatible helical threads of the nozzle 48. The O-ring 47 is seen internal along an elevated rim 49 to seal against the forward edges 51 of the extension tube 42A as it press fits internally inside the proximal and distal ends of the nozzle tube 44A.

Figure 3B:
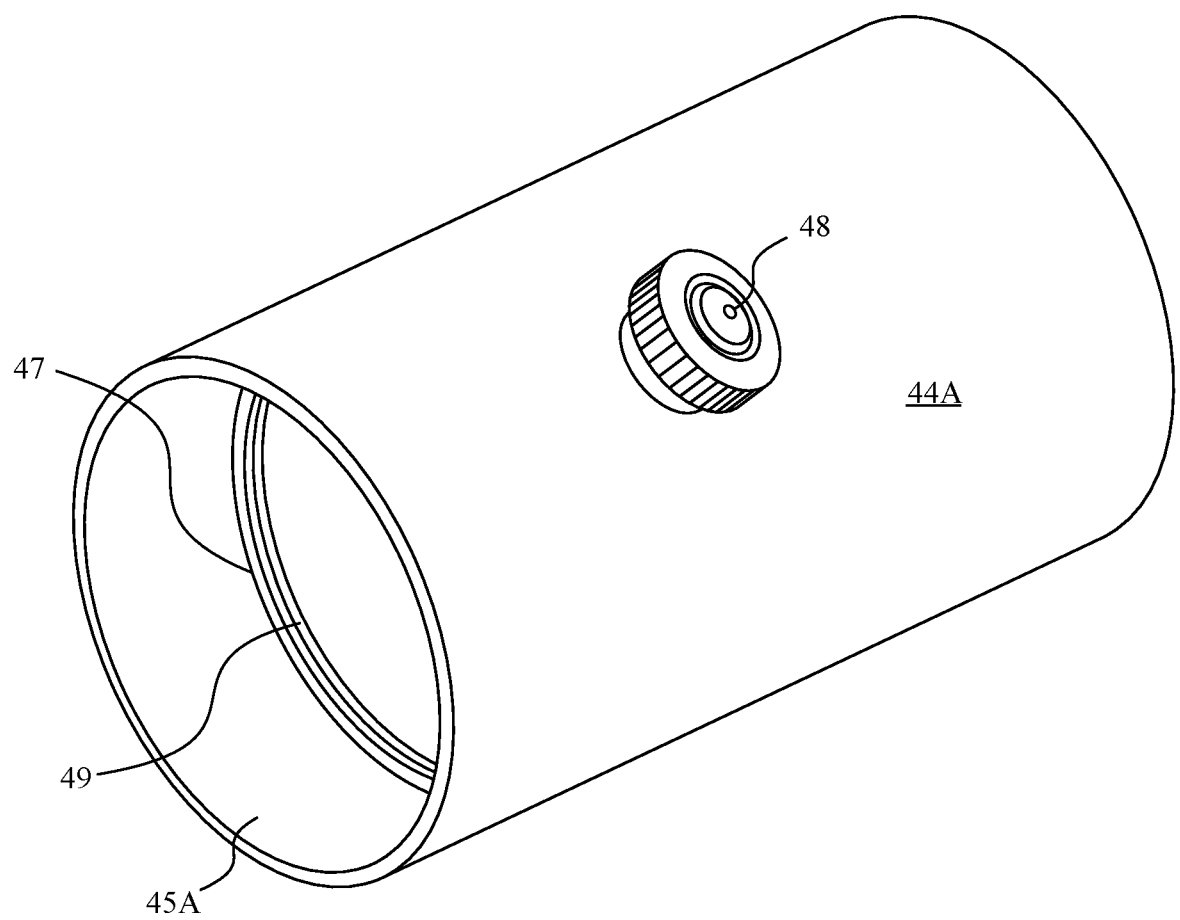
FIG. 3B depicts an assembly of a mister nozzle tube with a nozzle.

FIG. 3B depicts an assembly of a mister nozzle tube 42A with nozzle 48 that is in helical thread mesh engagement with the threads along the walls of nozzle cavity 46.

Figure 4A:
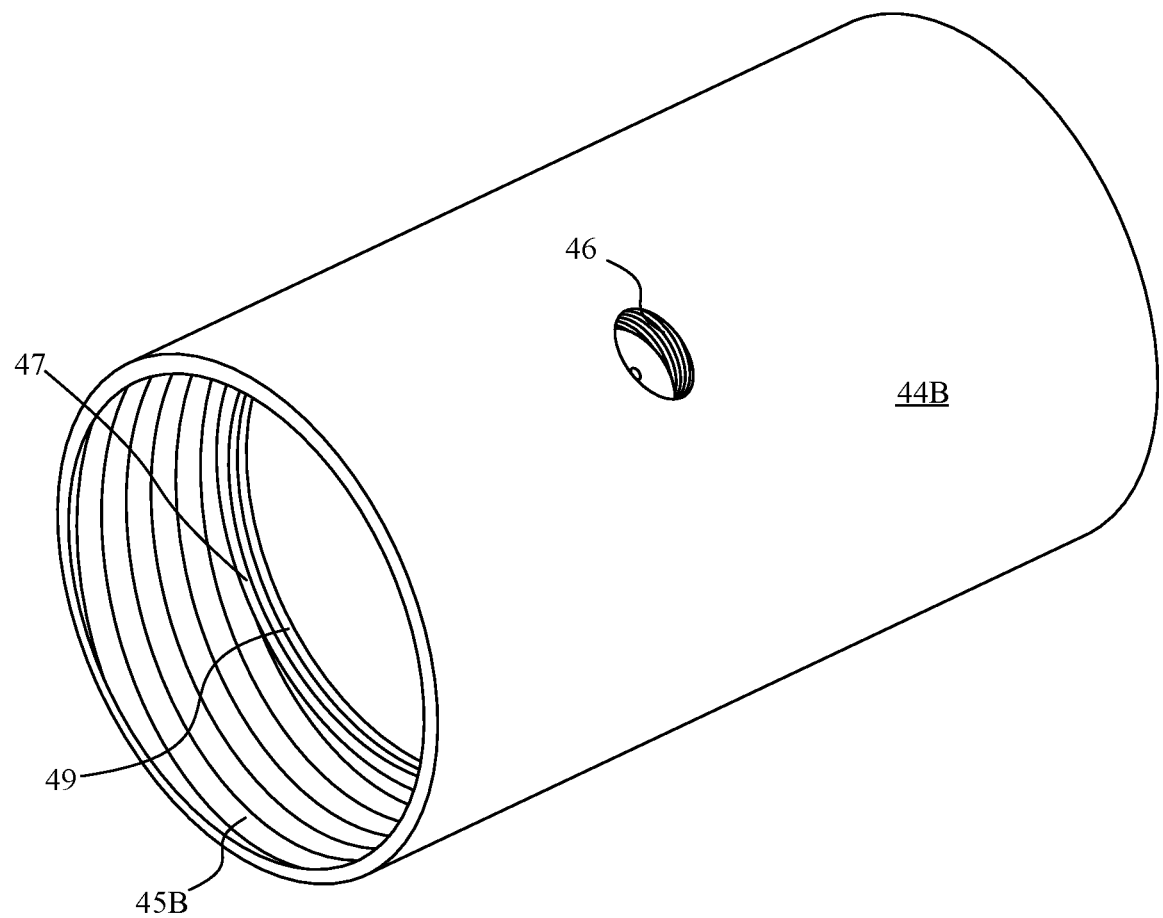
FIG. 4A depicts a mister nozzle tube configured for threaded fastener connection to other compatibly configured structures.

FIG. 4A depicts a mister nozzle tube 44B configured for a helical fastener-like connection with helical threads 45B to other compatibly threaded structures such as the externally located helical threads 55 located at the distal and proximal ends of extension tube 42B. Also depicted is O-ring 47 that is seen internal along an elevated rim 49 to seal against the forward edges 53 of the extension tube 42B as the fastener connects with the proximal and distal ends of the nozzle tube 44B.

Figure 4B:
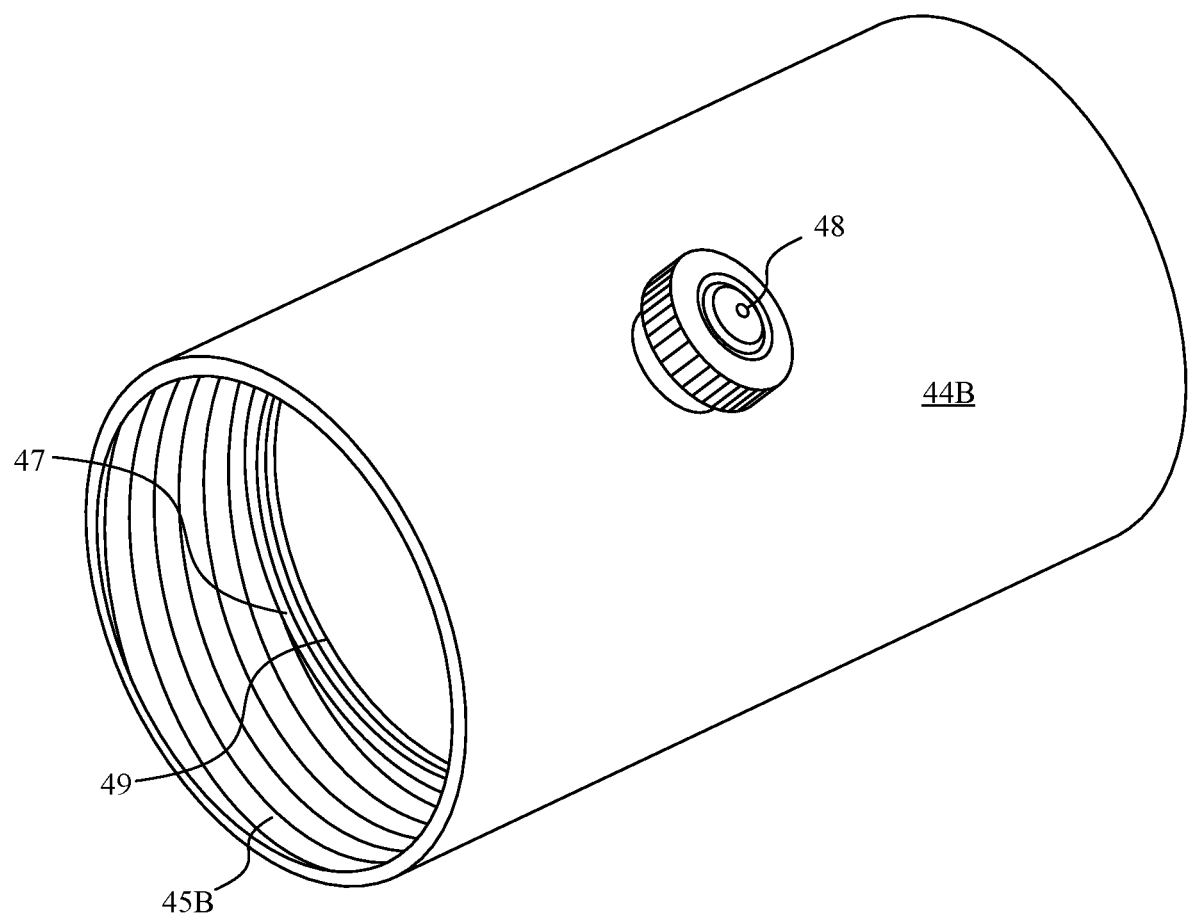
FIG. 4B depicts an assembly of a fastener configured mister nozzle tube with a nozzle.

FIG. 4B depicts an assembly of a fastener configured mister nozzle tube 44B with a nozzle 48 in helical thread mesh engagement with the threads along the walls of nozzle cavity 46.

Figure 5:
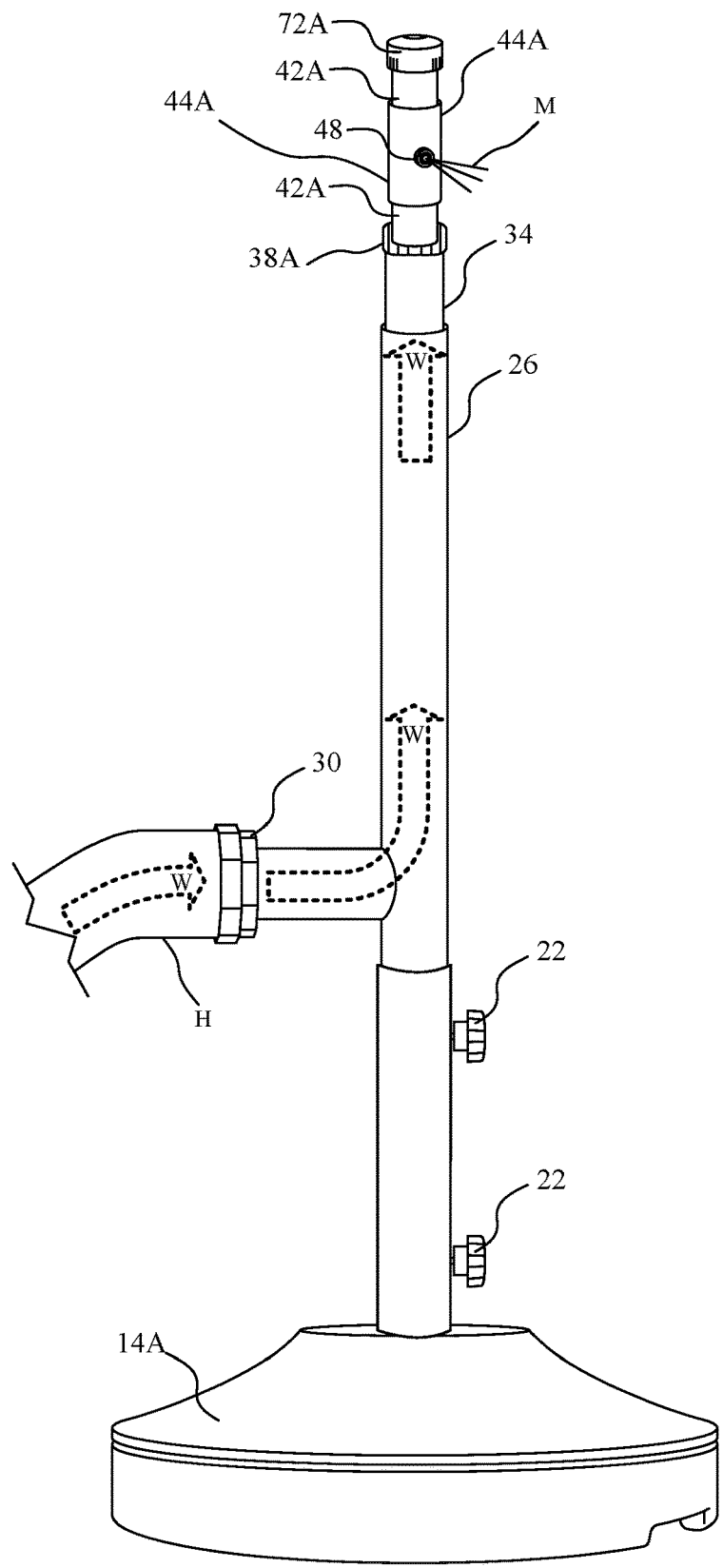
FIG. 5 depicts the lower assembly of FIG. 2 further built up with an upper assembly to produce a first basic mister with a single misting nozzle from components of the first embodiment of the mister assembly kit depicted in FIG. 1A.

FIG. 5 depicts the lower assembly of FIG. 2, further built up with an upper assembly to produce a first basic mister with a single misting nozzle from components of the first embodiment of the mister assembly kit depicted in FIG. 1A. The first basic mister includes the solid base 14A with tube holder 18 and securing knobs 22 that firmly holds hose connection 26. In a first preferred embodiment, a connector (such as 38A of FIG. 1A and shown later in FIG. 24 in more detail) hydraulically connects with the distal arm of the hose connection 26, then the first extension tube 42A, followed by nozzle tube 44A, then the second extension tube 42A, then finally terminally secured with mister cap 72A. Alternately, or in addition, optional telescopic adjustor 38 hydraulically connects with the distal arm of the hose connection 26, then the first extension tube 42A, followed by nozzle tube 44A, then the second extension tube 42A, then finally terminally secured with mister cap 72A. Upon attachment of hose H to hose connection 30, water W enters, as indicated by the dashed flow arrows the hose connection 26 and upwardly transits to the mister tube 44A and emerges from the mister nozzle 48 as mist M.

Figure 6:
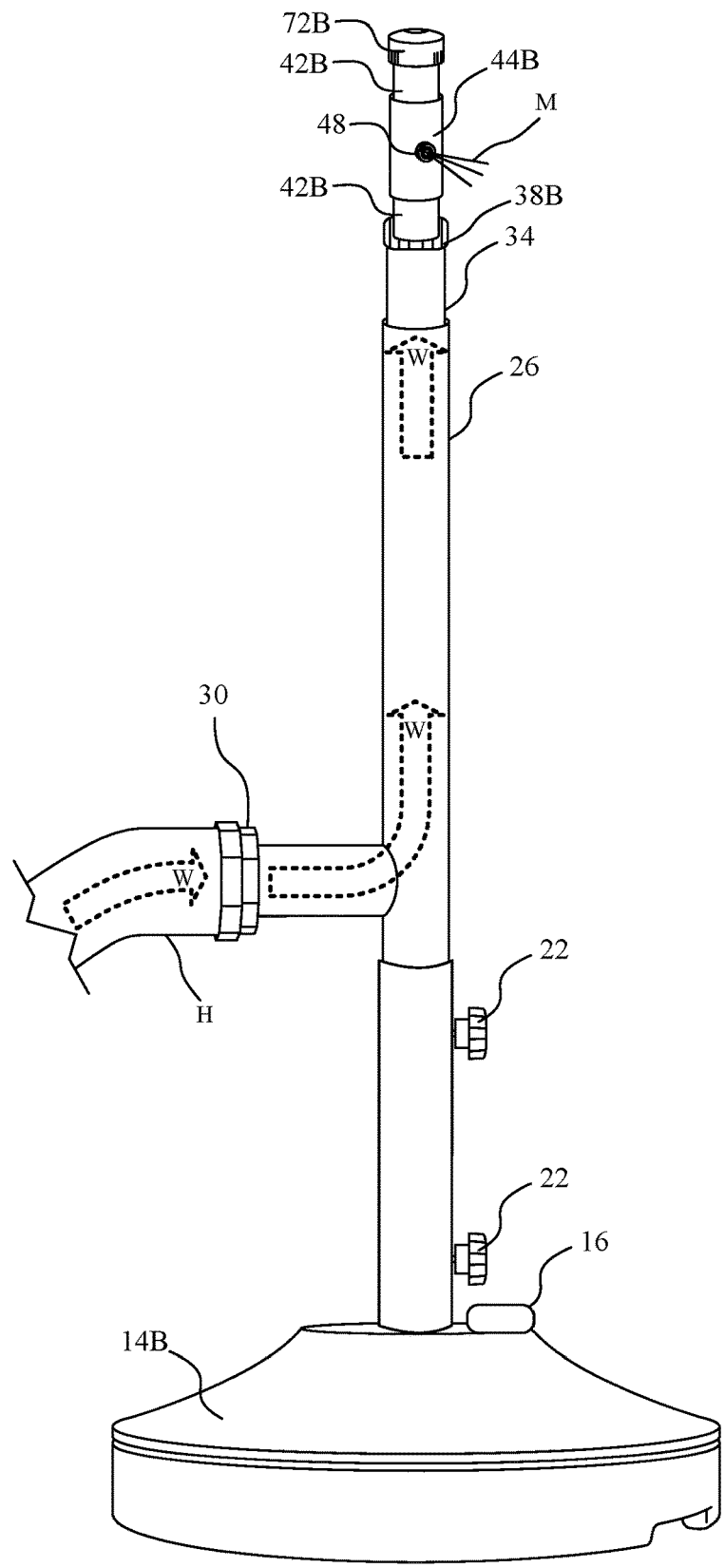
FIG. 6 depicts a second basic mister with a single misting nozzle built up from a water-Tillable base and assembled from other components of the second embodiment of the mister assembly kit depicted in FIG. 1B.

FIG. 6 depicts a second basic mister with a single misting nozzle similar to FIG. 5, but instead built up from a water-Tillable base and assembled from other components of the second embodiment of the mister assembly kit depicted in FIG. 1B. The second basic mister includes the water Tillable base 14B that is hollowed and capable of being filled with water, other liquids, or pourable granular material such as sand through access port 16. With base's 14B tube holder 18 and securing knobs 22, the hose connection 26 is securely held. In a first preferred embodiment, a connector (such as that shown later in FIG. 24) hydraulically connects with the distal arm of the hose connection 26, then the first extension tube 42A, followed by nozzle tube 44A, then the second extension tube 42A, then finally terminally secured with mister cap 72A. In a first preferred embodiment, a connector (such as 38B of FIG. 1B and shown later in FIG. 25 in more detail) hydraulically connects with the hydraulically upper portion of the hose connection 26 to which the first extension tube 42B is attached, followed by nozzle tube 44B, then the second extension tube 42B. Thereafter this basic mister is terminally secured with mister cap 72B. Upon attachment of hose H to hose connection 30, water W enters, as indicated by the dashed flow arrows the hose connection 26 and upwardly transits to the mister tube 44B and emerges from the mister nozzle 48 as mist M.

Figure 7A:
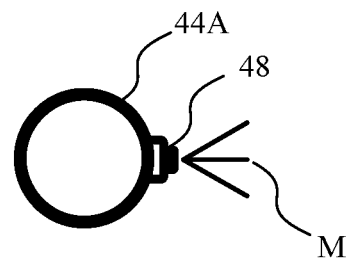
FIGS. 7A and 7B depict top and side views of a single mister tube.
Figure 7B:
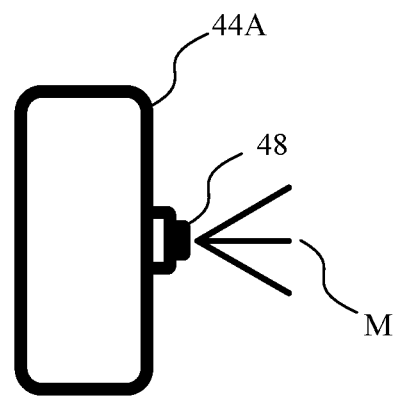

FIGS. 7A and 7B depict top and side views of a single nozzle tube 44A. Top view depicted in FIG. 7A depicts nozzle tube 48 emanating mist M in a single direction. Side view depicted in FIG. 7B depicts nozzle tube 48 emanating mist M in a single direction. Mist M emerging from nozzle tube 48 in a substantially single direction does not have matching counter balancing forces.

Figure 8A:
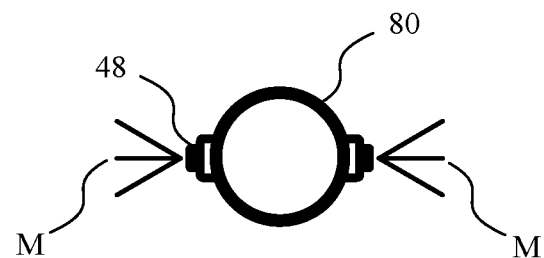
FIGS. 8A and 8B depict top and side views of a dual mister tube.
Figure 8B:
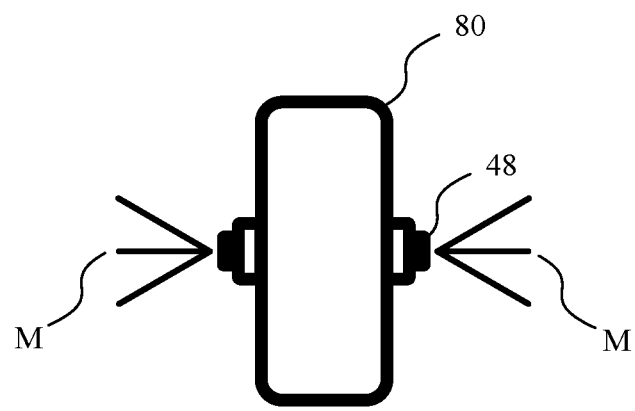

FIGS. 8A and 8B depict top and side views of a dual nozzle tube 80. Each nozzle 48 of the dual mister tube 80 is approximately 180 degrees opposed to each other such that emerging mist M from nozzles 48 impart counterbalancing forces.

Figure 9:
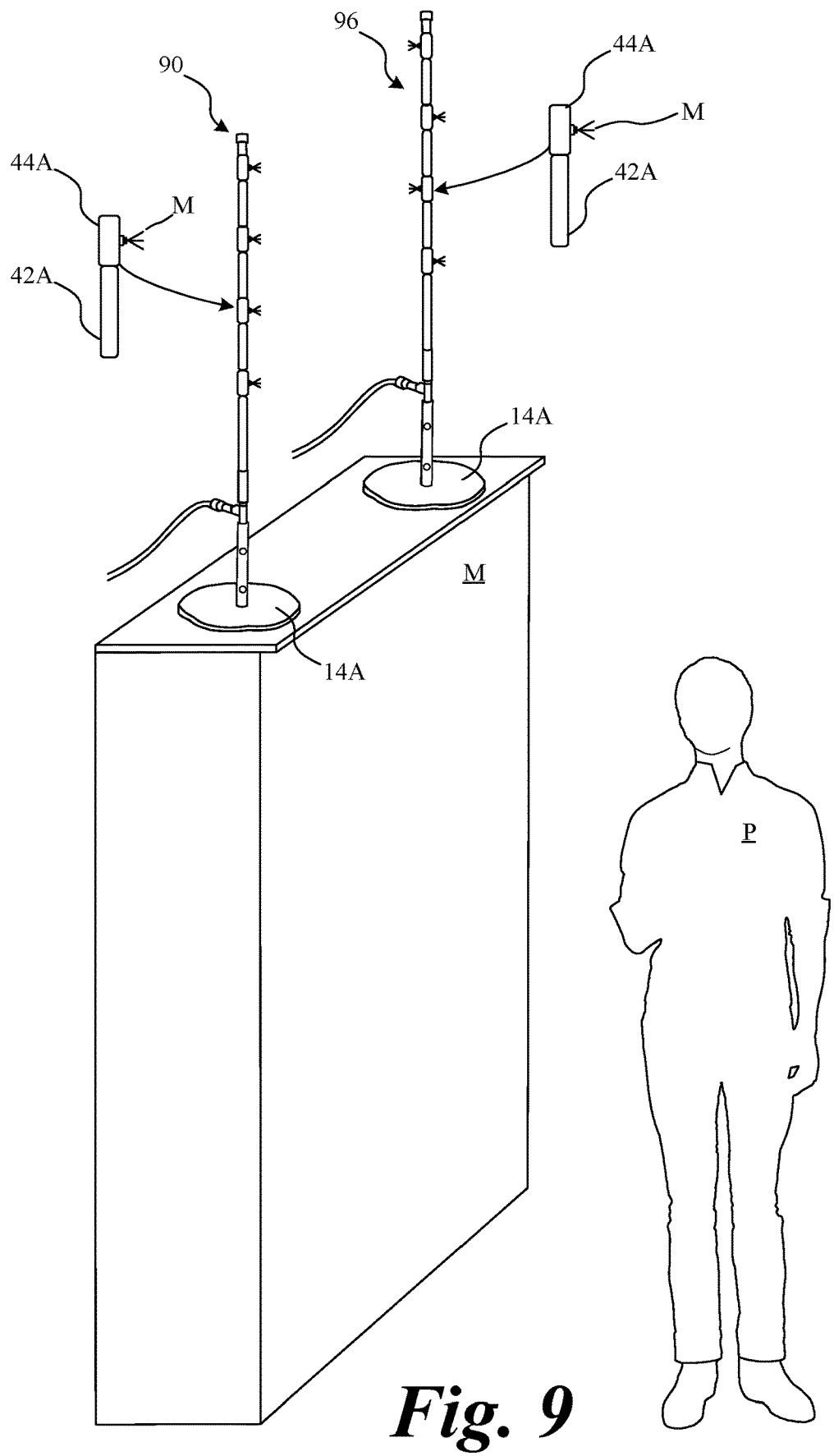
FIG. 9 depict two misters placed on an outdoor mantle.

FIG. 9 depict two mister stands 90 and 96 placed on an outdoor mantle. Mister stand 90 includes solid base 14A but with the four nozzle tubes 44A all aimed in the same direction. This alignment of nozzle tubes 44A renders cumulative unbalanced forces as all the emerging mists M are aligned and are directed substantially in the same direction. The head of person P is about 2.5 head distances or more lower than the first single mister tube 44A of mister stand 90 or mister stand 96.

Mister stand 96 presents having a different arrangement of single mister tubes 44A. Here the four nozzle tubes 44A alternate in direction such that mister stand 96 will not experience unbalanced mist M forces as one nozzle tube 44A is aimed in an approximately 180 degree orientation opposite adjacent nozzle tubes 44A. Mister stand 96 also utilizes solid base 14A.

Figure 10:
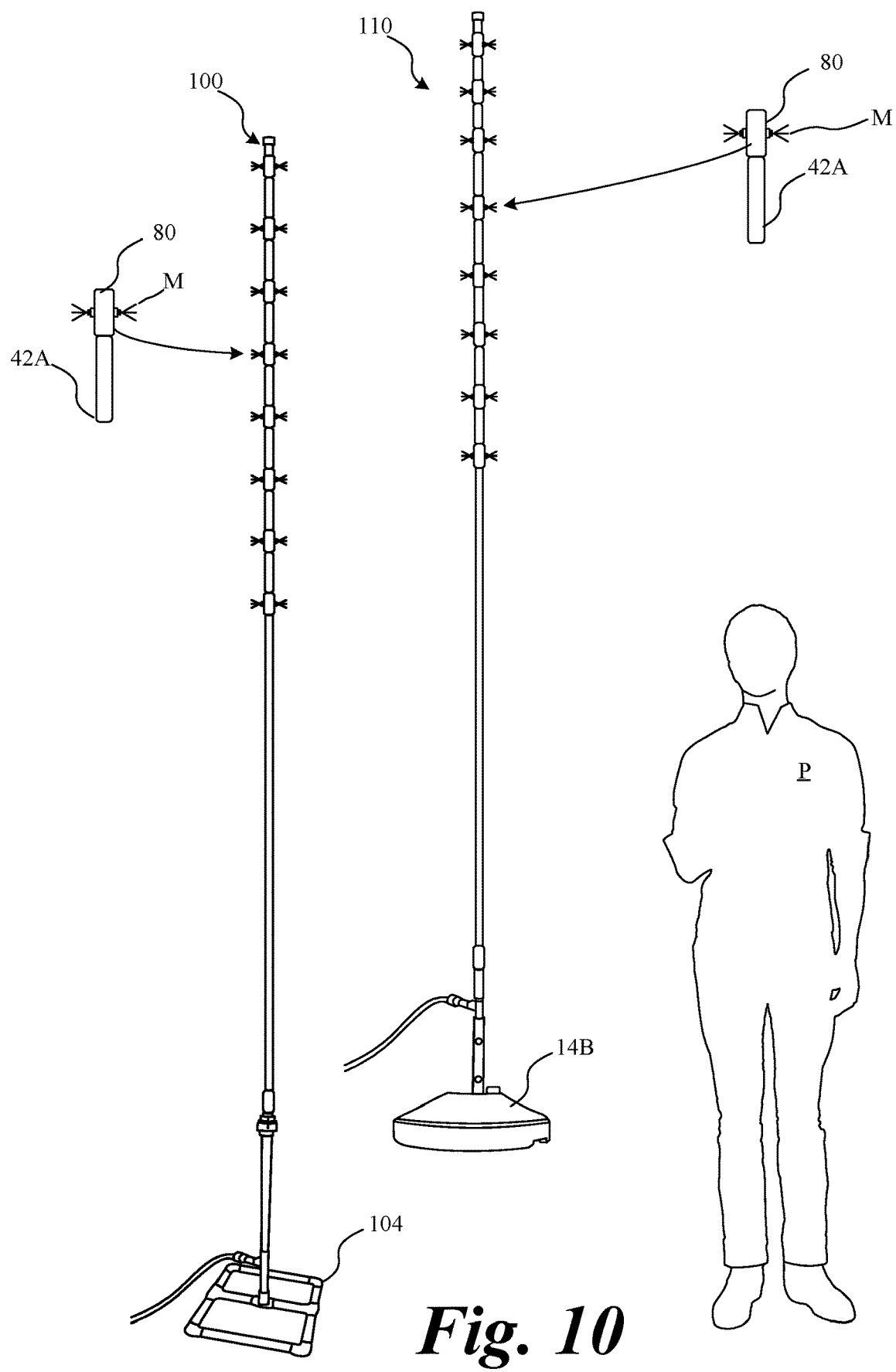
FIG. 10 depict two floor-positioned mister stands.

FIG. 10 depict two floor mister stands 100 and 110 placed the outdoor floor upon which person P stands nearby mister stands 100 and 110. Mister stands 100 and 110 utilize eight dual mister tubes 80 more or less co-aligned but due to counterbalancing emerging mists M does not present unbalancing forces to the mister stands 100 and 110. The head of person P is about 2.5 head distances or more lower than the first dual nozzle tube 80 of mister stand 100 or mister stand 110 to allow dispersion of the mist before contacting persons in the vicinity.

Mister stand 100 arises from a square tubular stand 104. Tubular stand 104 may similarly be sealed together using PVC cement applied to corner, linear, and T-sections composed of Schedule 40 PVC polyvinyl chloride material. In contrast mister stand 110 arises from the water Tillable base 14B.

Figure 11A:
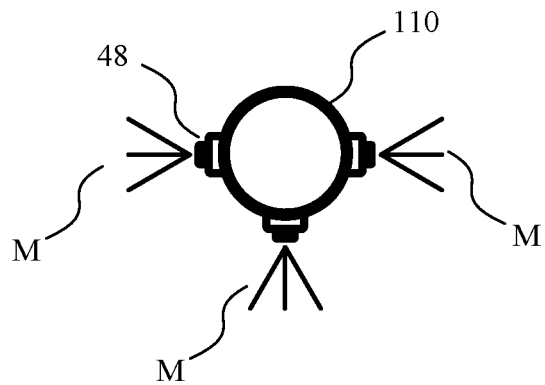
FIG. 11A-C depicts alternate arrangements for nozzle tubes.
Figure 11B:
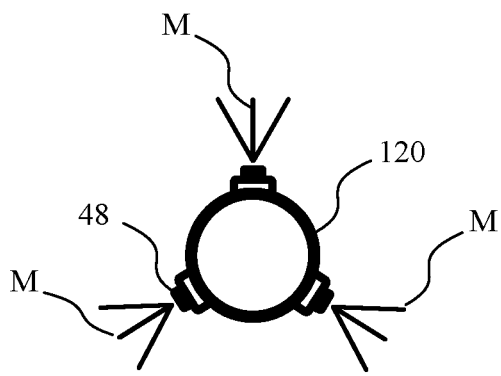
Figure 11C:
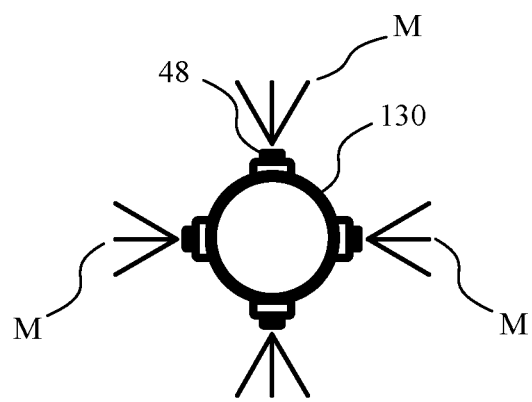

FIG. 11A-C depicts top views of alternate arrangements for nozzle tubes. FIG. 11A shows a net-unbalanced force nozzle tube 110 upon which three misters 48 and approximately 90 degrees apart leaving a 180 degree gap between two opposing misters 48. FIG. 11B depicts a net-balanced force nozzle tube 120 in which three misters 48 are about 120 degrees apart from each other. FIG. 11C depicts a net-balanced force nozzle tube 130 in which four misters 48 are about 90 degrees apart from each other.

Figure 12C:
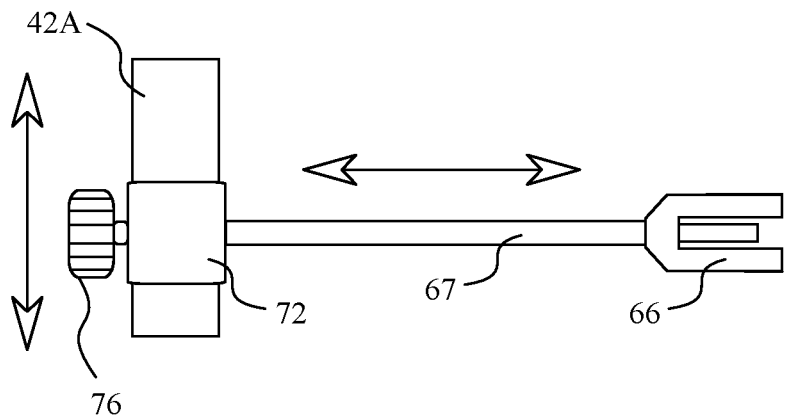
Figure 12C:
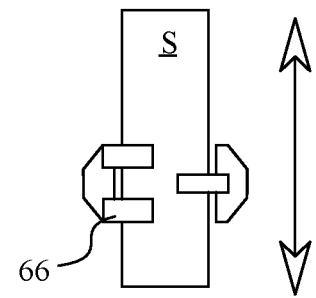
Figure 12C:
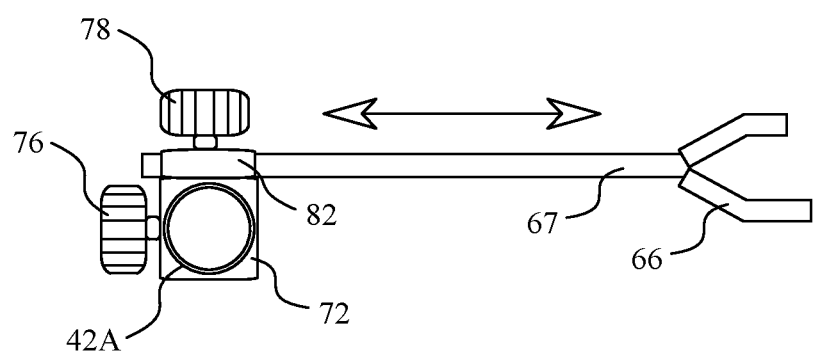

FIGS. 12A, 12B, and 12C depict a clamp securing unit 67 presented respectively in side, front, and top views. Securing unit 67 is provided for taller mister assemblies than the basic ones depicted in FIGS. 5 and 6 to guard against mister assembly tilting or falling over should the respective solid 14A and water-filled bases 14B not prove sufficient to keep the taller mister arrangements from tilting or falling over in high wind conditions.

The securing unit 67 includes a grappler 66 and sliding collar 73. Up and down vertical motion is controlled by pinching knob 76. The grappler 66 is configured to clamp grab onto tubular, shelf, or corner like structures adjacent to given mister assembly. Back and forth horizontal motion is controlled along channel 82 and is secured in position by pinching knob 78. As depicted here up and down motion of the securing unit 67 is along the vertical axis of extension tube 42A.

Figure 13A:
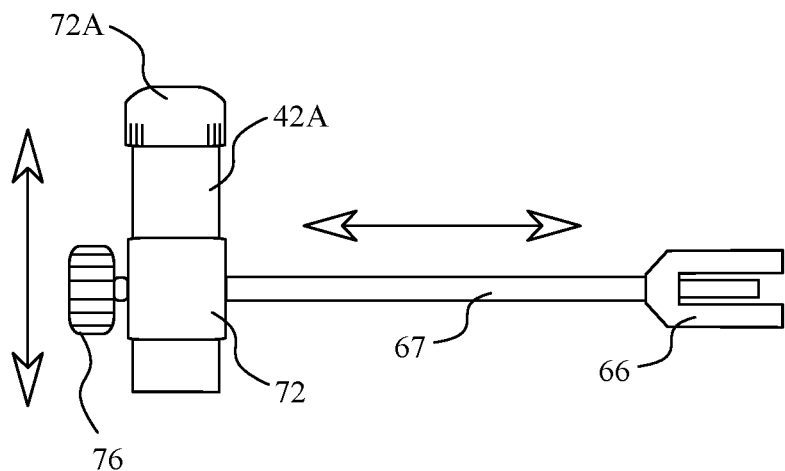
FIG. 13A depicts the clamp securing unit in slideable connection with a tube extension connected with a mister cap from the first embodiment of the mister assembly kit depicted in FIG. 1A.

FIG. 13A depicts the clamp securing unit 67 in slideable connection with a tube extension 42A connected with a mister cap 72A from the first embodiment of the mister assembly kit depicted in FIG. 1A.

Figure 13B:
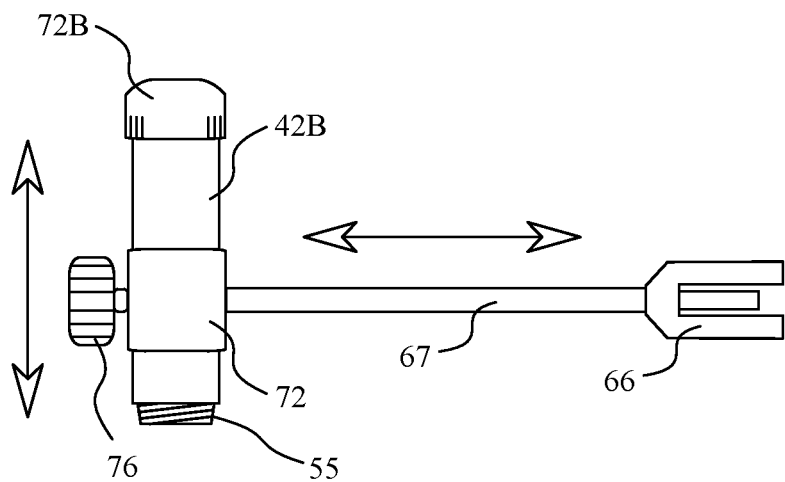
FIG. 13B depicts the clamp securing unit in slideable connection with a tube extension connected with a mister cap from the second embodiment of the mister assembly kit depicted in FIG. 1B.

FIG. 13B depicts the clamp securing unit 67 in slideable connection with a tube extension 42B connected with a mister cap 72B from the second embodiment of the mister assembly kit depicted in FIG. 1B. Shown at the proximal end of extension tube 42B are external threads 55. These external threads 55 also occupy the distal end of the extension tube 55 which are meshed engaged with helical threads having the same pitch of the mister cap 72B.

Figure 14:
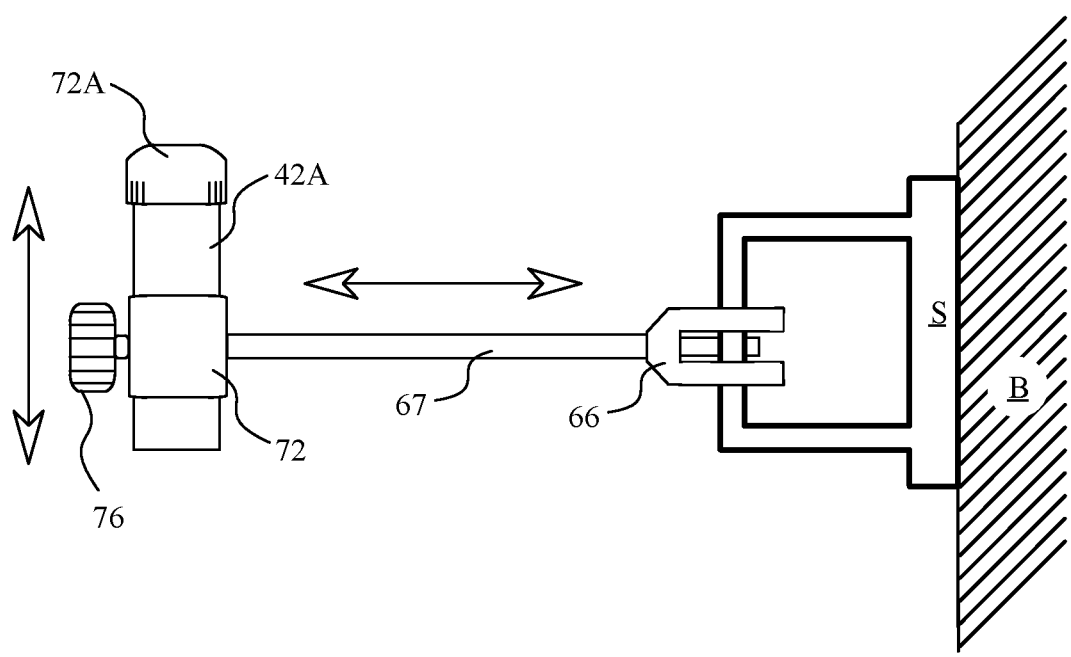
FIG. 14 depicts operation of the clamp securing unit gripping onto a securing structure

FIG. 14 depicts operation of the clamp securing unit 67 gripping onto a securing structure S of building B. Such an arrangement is advantageous when mister stands get substantially tall, say in the range of 15 to 30 nozzle tubes or more, and a prevailing wind gust could challenge the ability of the bases previously discussed, such as bases 14A, 14B, or 105 from the tall misting stand tilting or tipping over.

Figure 15:
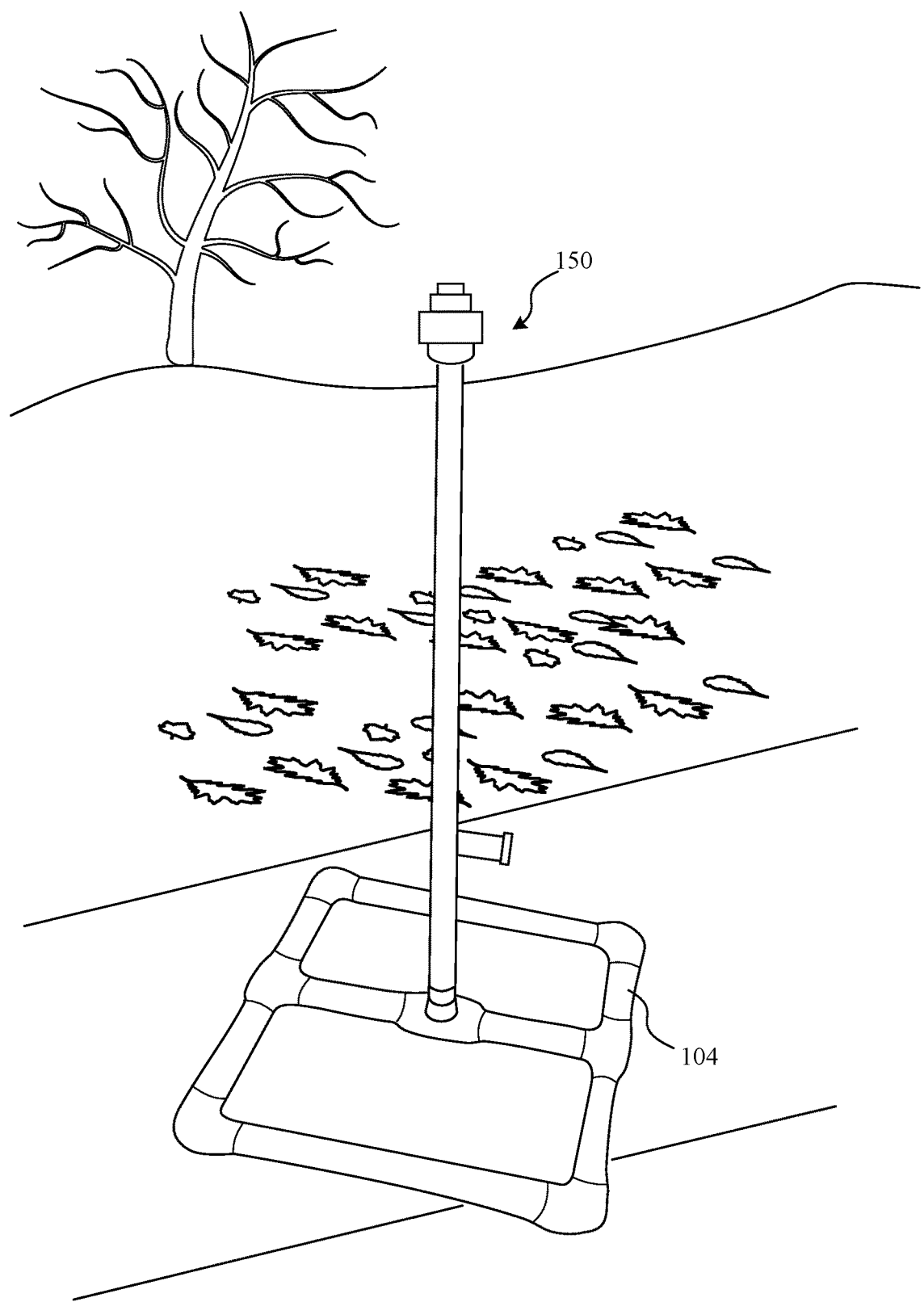
FIG. 15 depicts the partial construction of a mister stand arising from a square tubular base.

FIG. 15 depicts the partial construction of a mister stand arising from a square tubular base. Square tubular base 104 supports the construction-in-progress of partial construct mister 150.

Figure 16:
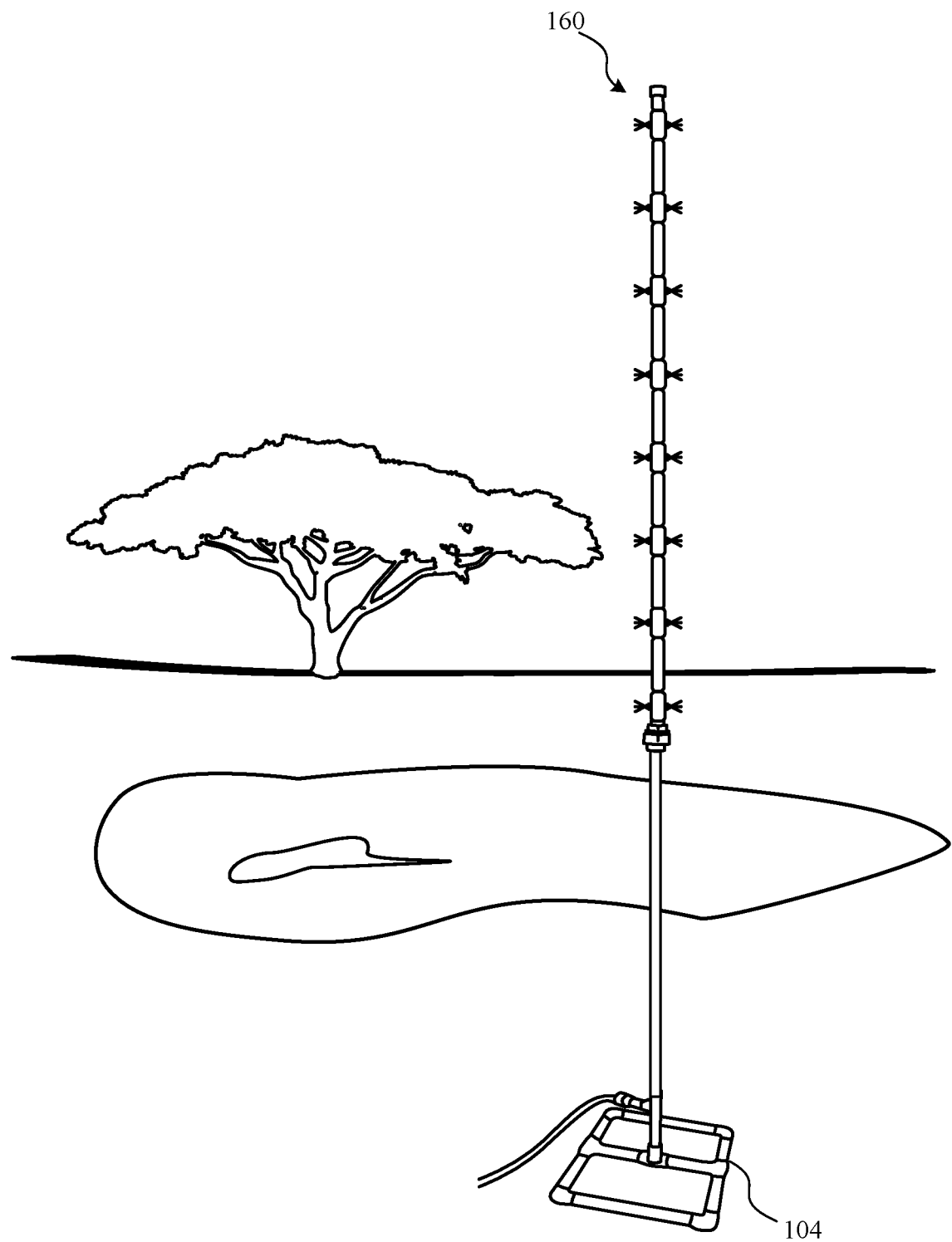
FIG. 16 depicts the completion of a mister stand arising from a square tubular base.

FIG. 16 depicts the completion of a mister stand 160 arising from the square tubular base 104.

Figure 17:
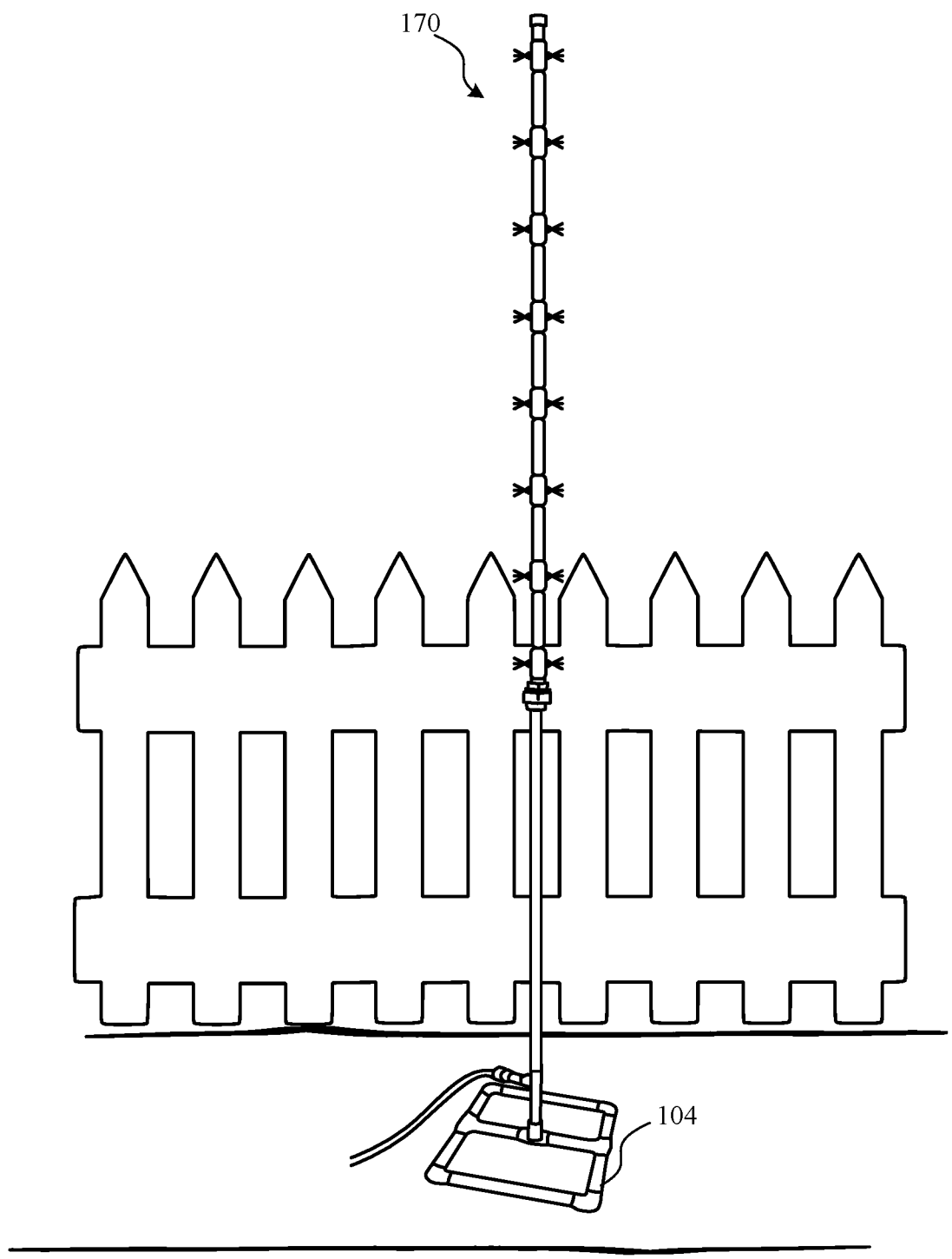
FIG. 17 depicts the misting operation of a mister stand arising from a square tubular base.

FIG. 17 depicts the misting operation of a mister stand 170 arising from the square tubular base 104.

Figure 18:
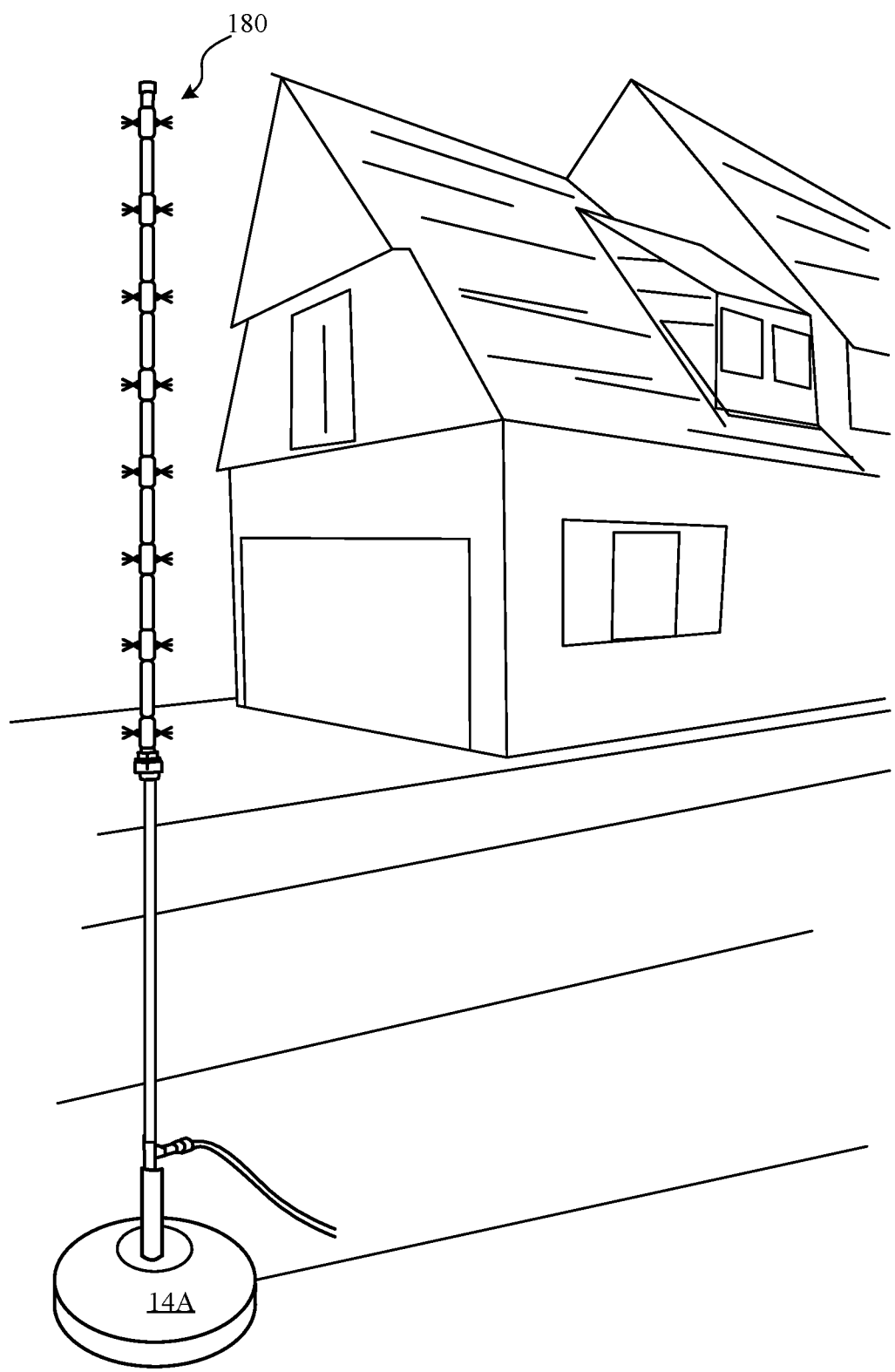
FIG. 18 depicts the misting operation of a mister stand arising from a solid circular base.

FIG. 18 depicts the misting operation of a mister stand 180 arising from a solid circular base 14A.

Figure 19:
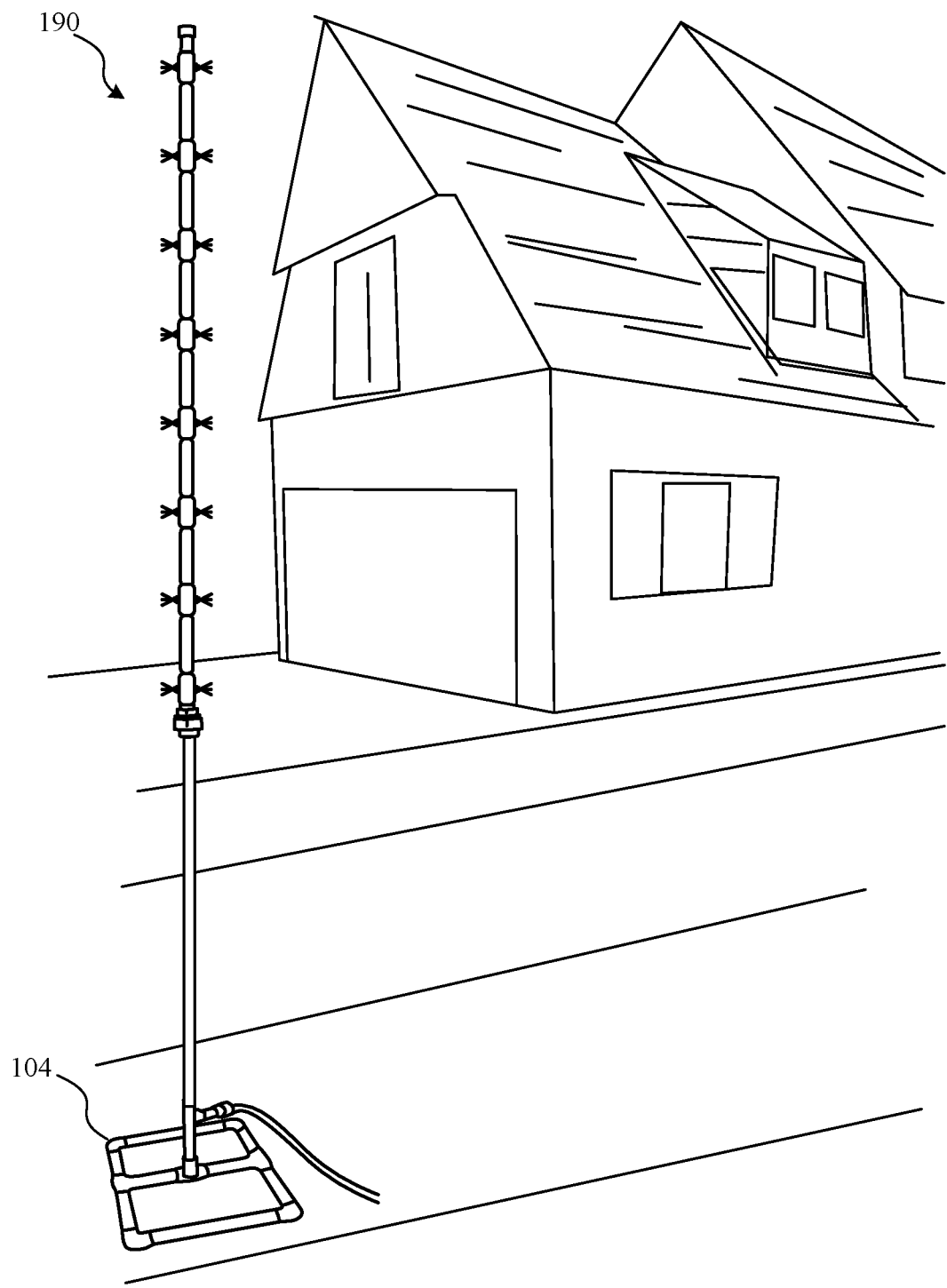
FIG. 19 depicts the misting operation of a mister stand arising from a square tubular base.

FIG. 19 depicts the misting operation of a mister stand 190 arising from the square tubular base 104.

Figures 20, 21:
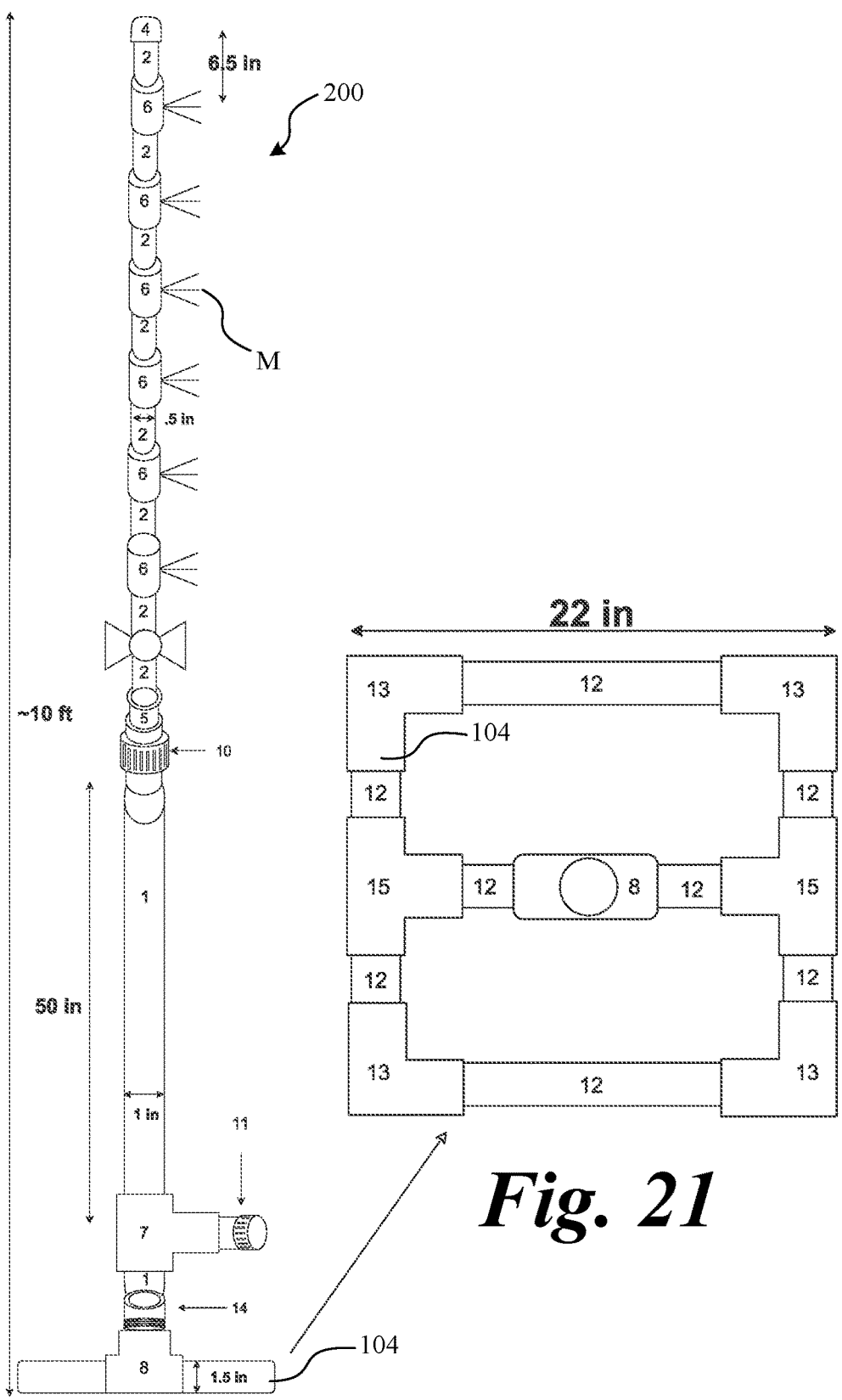
FIG. 20 depicts a mister stand approximate 10 feet tall.
FIG. 21 depicts the tubular base of mister stand of FIG. 20.

FIG. 20 depicts a mister stand 200 approximate 10 feet tall. Arising from base 104 mister stand further includes T-connection 8, long extension tube 1, tightener 10, and a series of alternating mister nozzle tubes 6 connected with extension tube spacer 2 that connects to tube receiver 5 all in fluid communication to hose connector 7. Long extension tube 1 measures approximately 50 inches in length and is about 1 inch wide. Six nozzle tubes 6 comprise mister stand 200 with the terminal located extension tube spacer 2 making sealing contact with mister cap 4. Upon hose connection to connector 11, water flows upwards to the nozzle tubes 6 where mist M emanates.

FIG. 21 depicts the tubular base 104 of the mister stand shown in FIG. 20. In one preferred embodiment tubular base 104 is substantially square and includes corners 13, tube connector 12 in sealing contact with corners 13, middle dispose T-connectors 15 in sealing contact with corners 12, and centrally located vertical disposed T-connector 8. In other embodiments of the tubular base 104 the shape may be triangular, rectangular, or other polyhedral shaped configuration.

The plastic material employed in misting stand 200 may include Schedule 40 PVC polyvinyl chloride material upon which an acetone based or other sealing solvents or PVC cements may be used to seal together extension tube 42A and nozzle tube 44A and other compatibly sized components to affect a permanent seal. The PVC cement may be dyed or clear.

Figure 22:
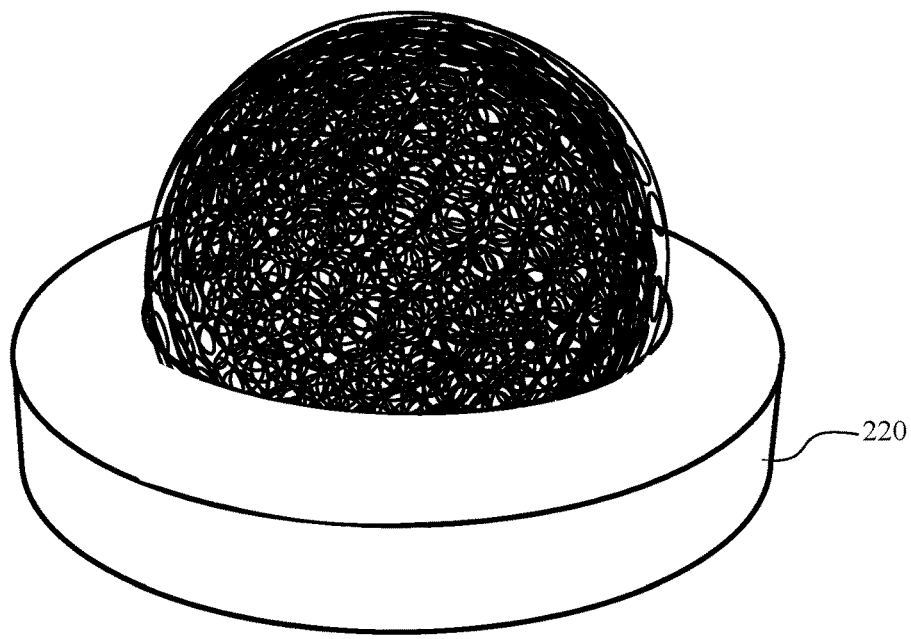
FIG. 22 depicts an inline filtration screen.

FIG. 22 depicts an inline filtration screen. Screen 220 is insertable into hose connector 30 for inline filtration of incoming water from public or private sources. The screen 220 removes sediment and other particulate matter to avoid clogging the orifices of the misters 48.

Figure 23:
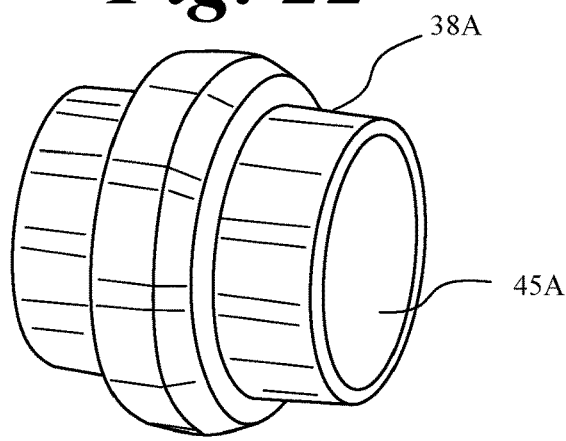
FIG. 23 depicts another embodiment of extension tube 42A.

FIG. 23 depicts another embodiment of extension tube 42A. The internal surface 45A is the area in which PVC cement may be applied for sealing to other components of mister stands.

Figure 24:
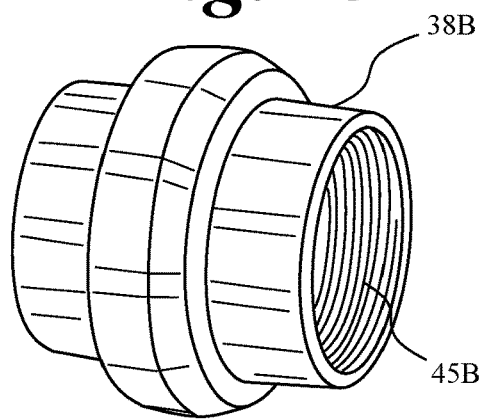
FIG. 24 depicts another embodiment of extension tube 42B.

FIG. 24 depicts another embodiment of extension tube 42B. The grooved internal surface 45B is the area in engagement with complementary shaped grooves for sealing to other components of mister stands.

Figure 25:
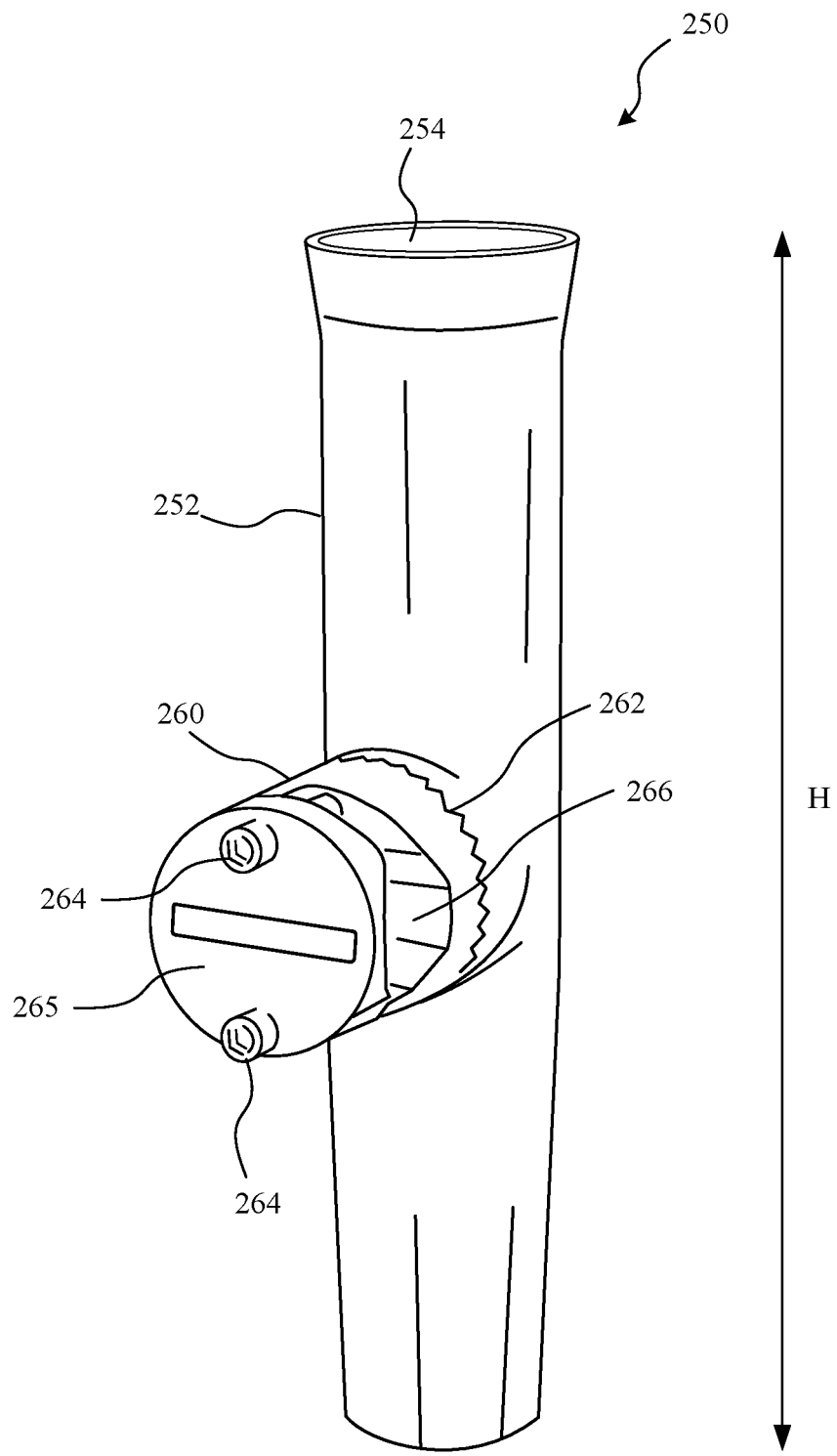
FIG. 25 depicts a marine vessel mountable fishing rod holder to function as a base to receive a mister assembled from the mister assembly kits depicted in FIGS. 1A and 1B.

FIG. 25 depicts a marine vessel mountable fishing rod holder to function as a base to receive a mister assembled from the mister assembly kits depicted in FIGS. 1A and 1B. Marine vessel fishing rod holder 250 includes a conically deposed tube 252 having cavity 254 configured to receive the lower tube portion of hose receiver 26 upon which marine vessel misters of virtually any configuration may be constructed from the remaining components of kit 10A or kit 10B, that is without bases 14A, 14B, and 104 depicted in FIGS. 1A, 1B, and 21. The marine vessel-deployed misters are synthesized to a configuration and height that provides mist in the environment and at the level required by a nearby user. In preferred embodiments Marine vessel fishing rod holder 250 may securely hold marine vessel deployed misters having similar configurations, lengths, and number, kind and orientation of misters 44A, 44B, 80, 110, 120, 130 as depicted in FIGS. 2-11C. In one preferred embodiment the height H is approximately 18 to 24 inches.

The marine vessel fishing rod holder 250 also includes an anchor lock 260 that emerges substantially perpendicular to the height H axis of the rod holder 250. The anchor lock 260 provides for alignment, tilt adjustments, and securing to horizontal, angled, or vertical bars located on marine craft. The anchor lock 260 includes adjustor crevice 262 having a jagged, clamping configuration that can be loosened via nuts 264, moved, and then undergo retightening until bar clamp cavity 266 matches the orientation of a particular marine vessel bar. The lock lid 265 can be removed after loosening nuts 264 to allow marine vessel bar adaptation into the matching orientation of clamp cavity 266 that favors a substantially vertical disposed conical tube 252. The lock lid 265 is then re-inserted and retightened with nuts 264 to establish a rigidly held fishing rod holder 250 that is suitably clamped to hold a variety of mister devices of variable length and mister tube combinations. For mister devices having substantial lengths, say more than 15 mister tube combinations, the clamp securing unit 67 depicted in FIGS. 12A-13B may be applied in an easy-on/easy-off manner to the terminal ends of a tall mister and secured to the mast or other marine vessel structure.

Figure 26:
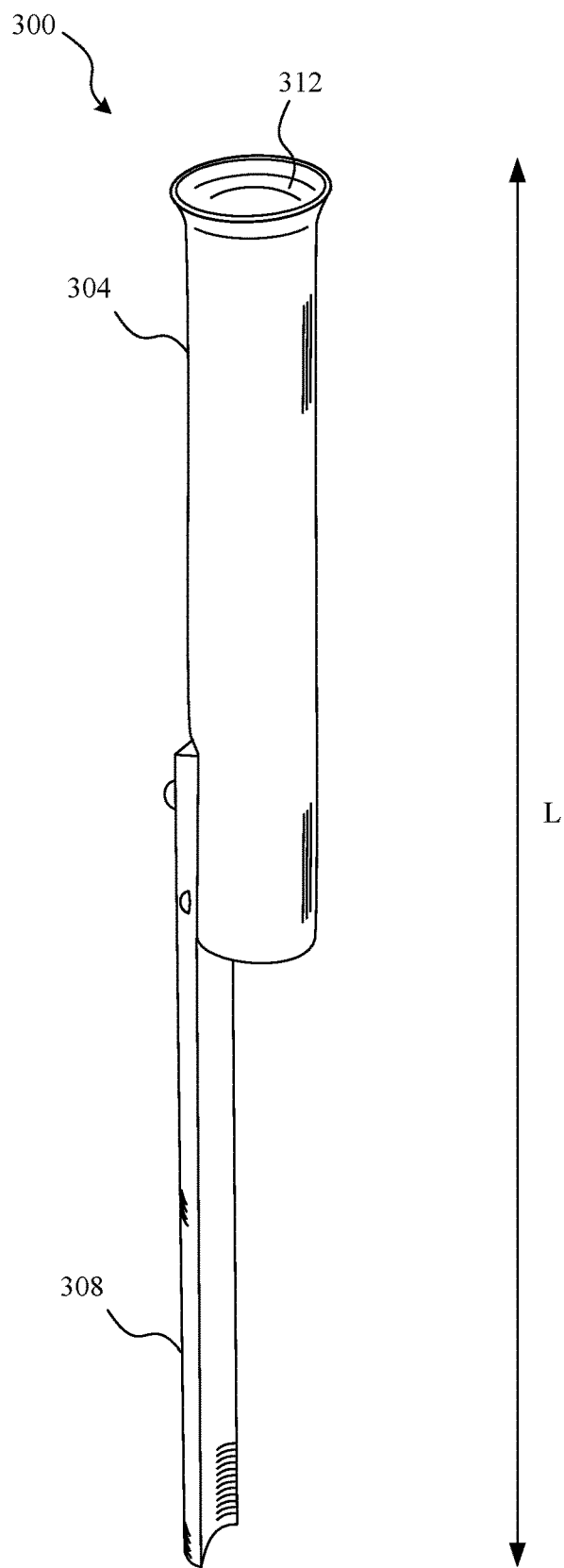
FIG. 26 depicts shoreline anchorable fishing rod holder to function as a base to receive a mister assembled from the mister assembly kits depicted in FIGS. 1A and 1B.

FIG. 26 depicts shoreline anchorable fishing rod holder to function as a base to receive a mister assembled from the mister assembly kits depicted in FIGS. 1A and 1B. Shoreline fishing rod holder 300 includes an upper disposed tube 304 attached to a lower disposed sand spike 308. A cavity 312 of tube 304 is configured to receive the lower tube portion of hose receiver 26. A shoreline mister device of virtually any configuration made from the remaining components of kit 10A or kit 10B, without bases 14A, 14B, and 104 to make a fishing rod holder base 300 mister device appropriate for the shoreline environment that a user occupies and that provides mist at the level required by the nearby user. In preferred embodiments the shoreline mister may have a similar configuration with and orientation of misters to those misters depicted in FIGS. 2-11C. In one preferred embodiment the length L is approximately 42 inches.

The sand spike 308 is configured to drive into sands of variable densities to establish a securing base amenable to making tall misters sustainable to resist normal wind gusts under non-stormy conditions. These embodiments would include mister configurations varying in height between 5 and 15 feet. In rocky shorelines not amenable to driving the sand spike 308 deeply, rope may be fastened around the sand spike 308 to a nearby structure, say a fence, building, or tree.

Figures 27, 28:
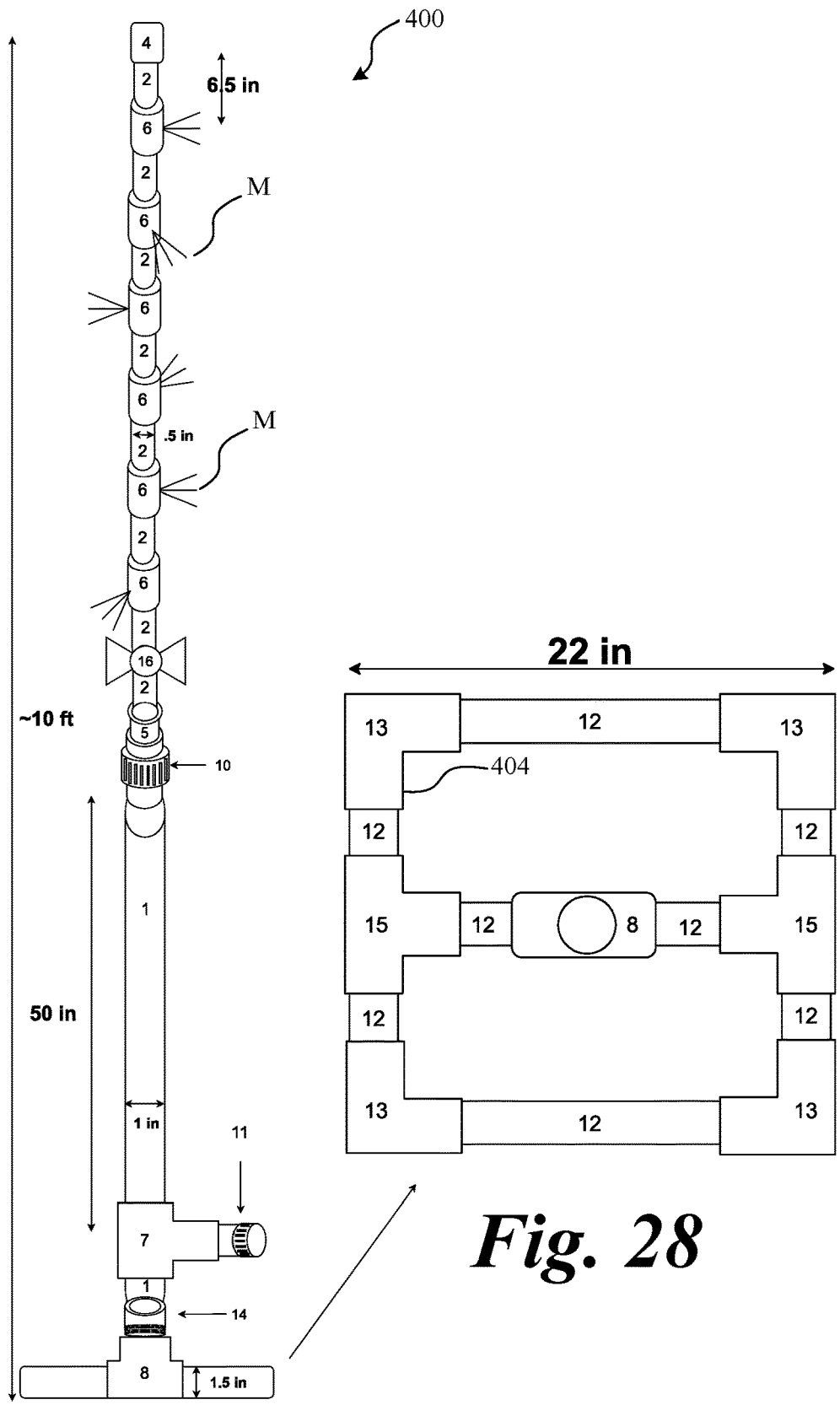
FIG. 27 depicts a mister stand equipped with a ball valve.
FIG. 28 depicts the tubular base of the mister stand depicted in FIG. 27.

FIG. 27 depicts a mister stand 400 equipped with a ball valve 16. The mister stand 400 is approximately 10 feet tall, but may be taller. Arising from base 404 mister stand 400 further includes T-connection 8, long extension tube 1, tightener 10, and a series of alternating mister nozzle tubes 6 connected with extension tube spacer 2 that connects to tube receiver 5 all in fluid communication to hose connector 7. Long extension tube 1 measures approximately 50 inches in length and is about 1 inch wide. Six nozzle tubes 6 comprise mister stand 400 with the terminal located extension tube spacer 2 making sealing contact with mister cap 4. Upon hose connection to connector 11, water flows upwards to the nozzle tubes 6 where mist M emanates. The ball valve 16 serves at least three purposes: (1) ease of use by positioning it at the mister at a comfortable height (and the hose bib may be left on); (2) maintaining the water level in the lower segments within a particular mister to establish weight and thereby help maintain balance; and (3) to regulate and/or reduce the pressure and volume of the water before it enters the mister nozzles.

When the screen 220, as depicted in FIG. 22, is inserted into hose connector 30 of FIGS. 1A and 1B, the inline filtration of incoming water from public or private sources allows for removal of sediment and other particulate matter by the screen 220 to avoid clogging the orifices of the misters 48. When in position, as the hose H is turned on, a full water level is maintained below the ball valve 16 which helps keep a particular mister properly balanced in the case of wind or other external forces.

FIG. 28 depicts the tubular base 404 of the mister stand 400 depicted in FIG. 27. In one preferred embodiment tubular base 404 is substantially square and includes corners 13, tube connector 12 in sealing contact with corners 13, middle dispose T-connectors 15 in sealing contact with corners 12, and centrally located vertical disposed T-connector 8. In other embodiments of the tubular base 404 the shape may be triangular, rectangular, or other polyhedral shaped configuration.

Figure 29:
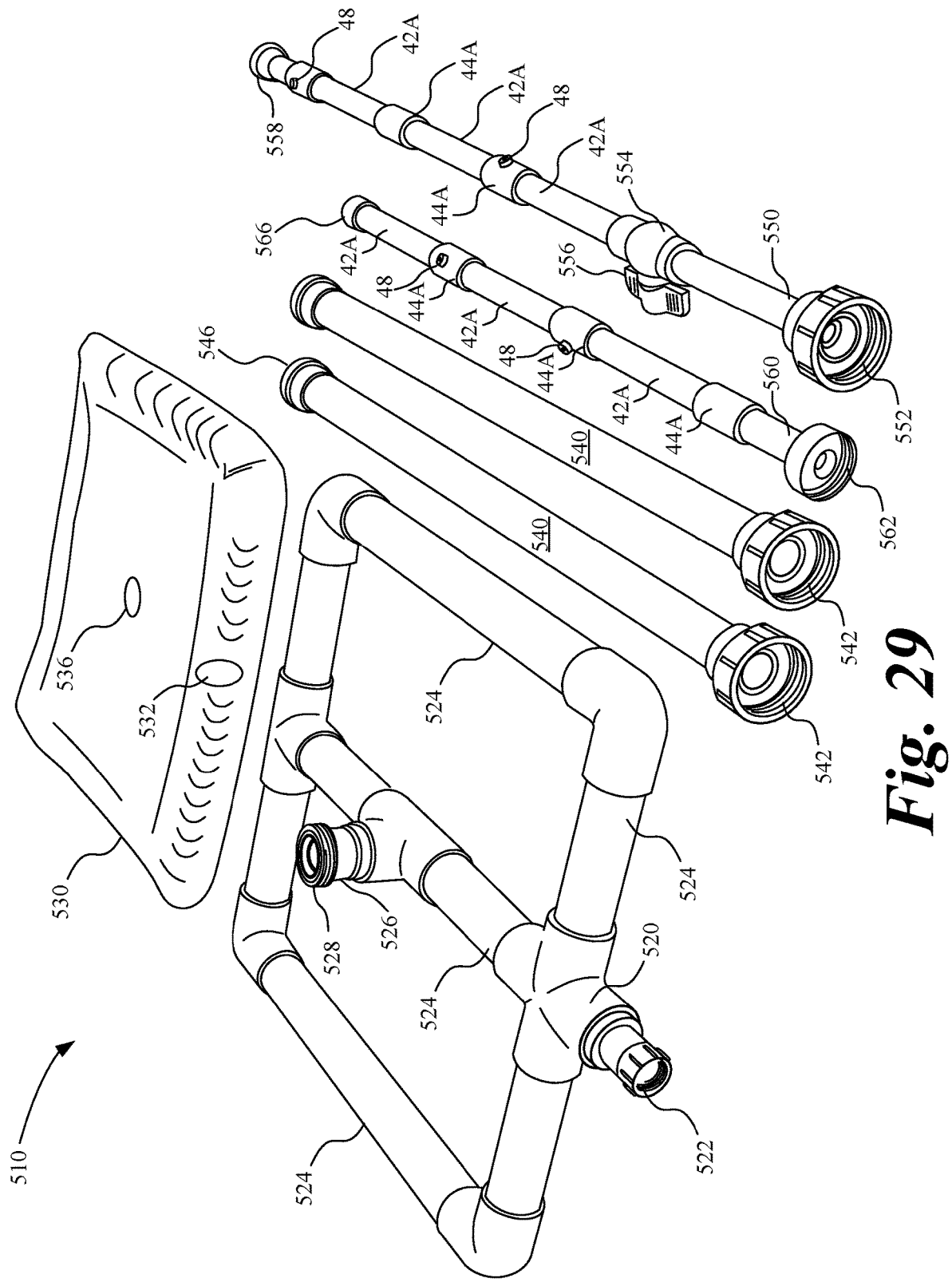
FIG. 29 depicts a perspective view of another embodiment of a mister kit comprised of six mister kit components.

FIG. 29 depicts a perspective view of another embodiment of a mister kit 510 comprised of six mister kit components. The mister kit 510 includes a tubular base 520, a base cover sack 530, two water extension pipes 540, an open-ended mister pipe 550, and a closed-ended mister pipe 560. The mister kit 510 allows for the convenient construction of a variety of different height mister assemblies to accommodate diverse misting requirements as local conditions dictate.

The tubular base 520 includes hose connector 522 in fluid connection and substantially coplanar with tubes 524 which receive incoming water from connector 524 at the lowest portion of the base 520 and distributes the water throughout the base 520 to stabilize the weight of the base at its lowest level to enable balanced support for the base 520 for various mister assemblies having differing heights. Outflow connector 526 located approximately in the middle of centrally located tube 524 directs the water upward to various combination of water extension pipes 540 and/or closed-ended mister pipe 560 having connecting ends mechanically engageable with the threading helical grooves 528 of the outlet 526 to impart sealable connection. In alternate embodiments the sealable connection is accomplished by quick release fittings. The base cover sack 530 is overlaid onto the tubular base 520 and has a front access aperture 532 that fits over the hose connector 522 and a top access aperture 536 that fits over the upwardly configured outflow connector 526. The base cover sack 530 imparts cushioning and decorative coverage to the tube configured base 520.

The water extension pipe 540 include a first end helically engageable connector 542 that receives incoming water, and second or downstream end 546 that conveys water from the water extension pipe 540 to either another water extension pipe 540, sealably engaged with the complementary fits between first end 542 of the send water extension pipe 540 with the second end 546 of the first water extension pipe 540.

The water extension pipes 540 are sealably engageable with the helical threads 528 of the outlet port 526 are the helical connectors 542 of the water extension pipes 540 and the helical connector 552 of the closed-ended mister pipe 560. The open-ended mister pipe 550 includes the helical connector 552, valve housing 554, valve handle 556 turnable within the valve housing 554, misters 48 connected to mister tube 44A (by press fit, sealable helical threads or otherwise), and downstream connector 558. The downstream connector 558 is sealably engageable with the helical threads 562 of the closed-end mister pipe 560. Integrally attached to the mister pipe 560 are misters 48 and sealed cap 566.

In operation, the open-ended mister pipe 550 receives water at the helical threaded connector 552 and conveys water through the helical threaded connector 558. The open-ended mister pipe 550 may be constructed as a series of press-fit nozzle tubes 44A interspaced with press-fit extension tubes 42A described in FIG. 1A. Similarly, the closed-end mister pipe 560 may also be constructed of a series of press-fit nozzle tubes 44A interspaced with press-fit extension tubes 42A. The closed-ended pipe 560, by being sealed with the cap 566, functions as the terminus of water flow, thereby providing pressure buildup to direct water flow through the orifices of the misters 48. In alternate embodiments the open-ended mister pipe 550 and the close-ended mister pipe 560 may be made as a sequence of threaded connection nozzle tubes 44B interspaced with a series of threaded connection tube extensions 42B as described in FIG. 1B.

Figure 30:
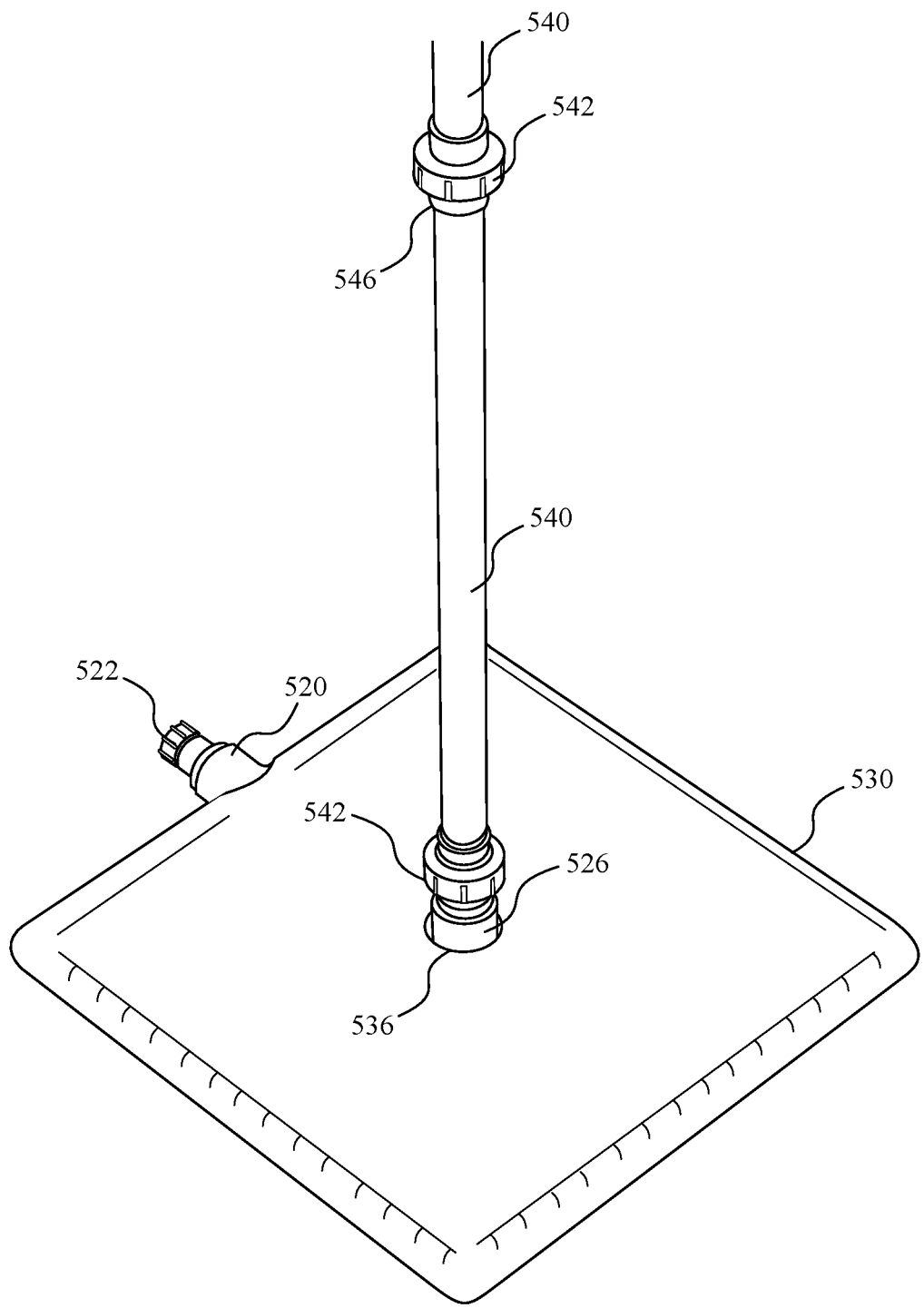
FIG. 30 depicts a partial assembly of the mister kit of FIG. 29.

FIG. 30 depicts a partial assembly of the mister kit 510 of FIG. 29. As depicted the hose attachment connector 522 of the tubular base 520 extends from the cover 530. To the outflow connector 526 of the base 520 that extends from the upper aperture 536 of the cover 530, water extension pipe 540 is sealably engaged via its threaded connector 542. At the top end of the water extension pipe 540 is a partial view of the other water extension pipe 540 that is connected to the base 520 connected pipe 540 via the complementary sealable engagement of the bottom pipe's 540 connector 546 with the top pipe's 540 connector 542.

Figure 31:
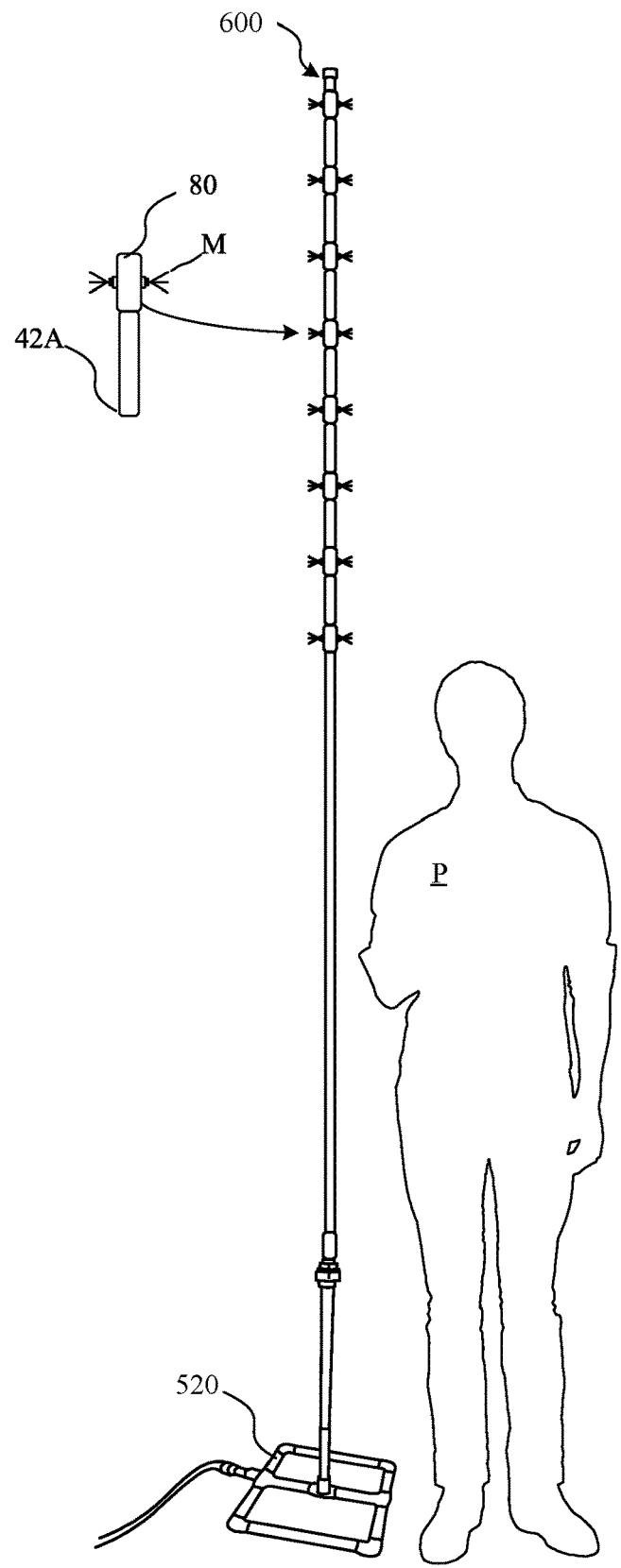
FIG. 31 depicts a mister assembly utilizing the base component of the mister kit of FIG. 29.

FIG. 31 depicts a mister assembly 600 utilizing the base component 520 of the mister kit 510 of FIG. 29. Adult size person P gives a relative scale of the height of one embodiment of the mister assembly 600.

Figure 32:
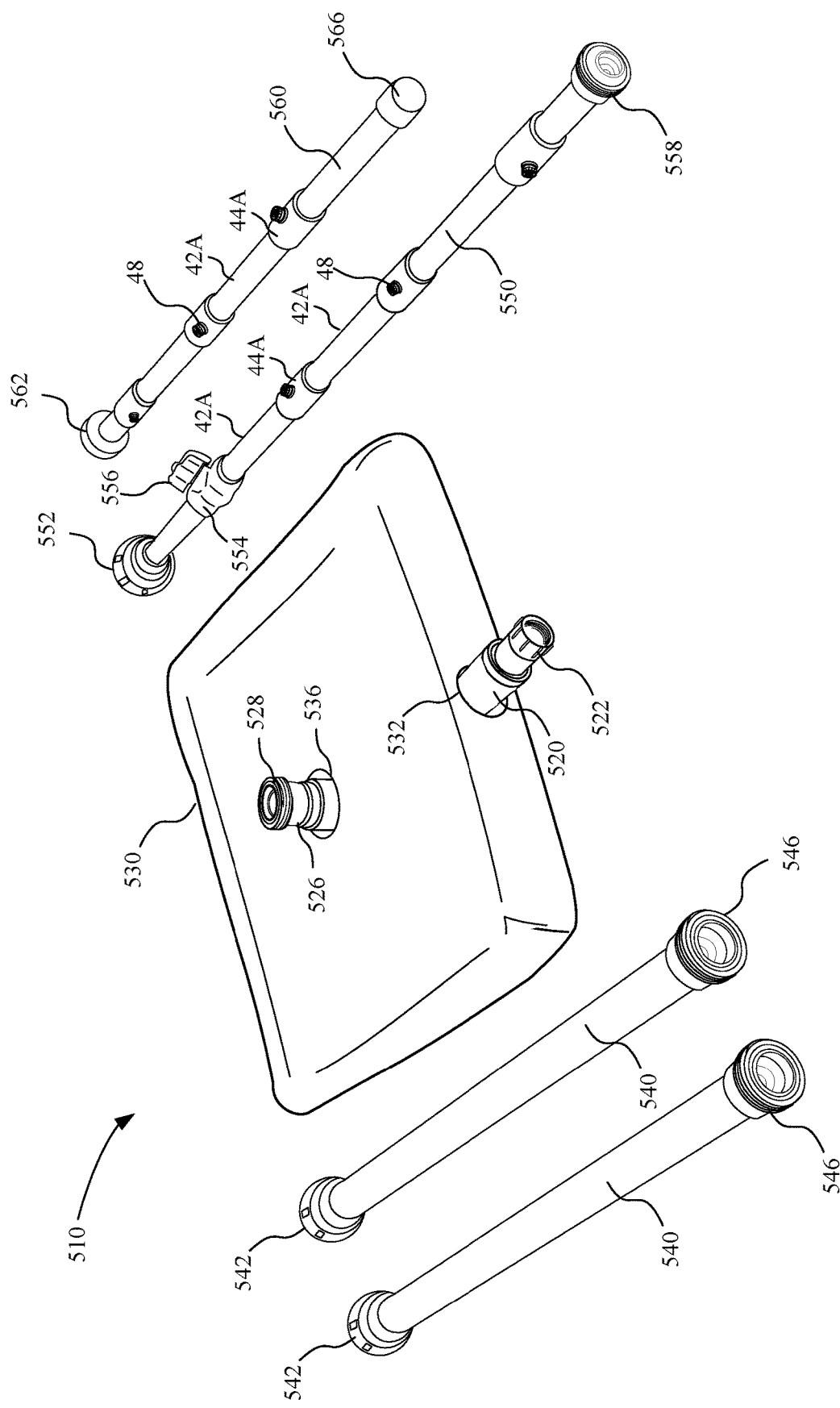
FIG. 32 depicts a complementary perspective view of the mister kit of FIG. 29.

FIG. 32 depicts a complementary perspective view of the mister kit 510 of FIG. 29. As depicted the helically threaded outflow ends 546 of the water extension pipes 540 and the outflow end 558 of the open-ended mister pipe 550 are seen in greater detail. Cover 530 may be made of neoprene, canvas, nylon or other material suitable for durable outdoor use. Cover 530 may have a zippered or hook and loop (e.g., Velcro®) slot to facilitate easy enclosure and removal of the base component 530. In use, cover 530 is shown placed over in a stretched fit enclosing the base component 520 in which hose connector 522 protrudes through side orifice 532. Similarly the outflow port 526 is shown protruding from the cover 530 via access orifice 536.

The physical relationship of subcomponents of the open-ended mister tube 560 described in FIG. 29 are delineated in the complementary perspective view as are the subcomponents of the closed-ended mister pipe 560. Similarly the location of helically threaded connector 542 on the water incoming side of the water extension pipe 540 and its water exiting helically threaded connector 546 are shown in the complementary perspective view.

Figure 33:
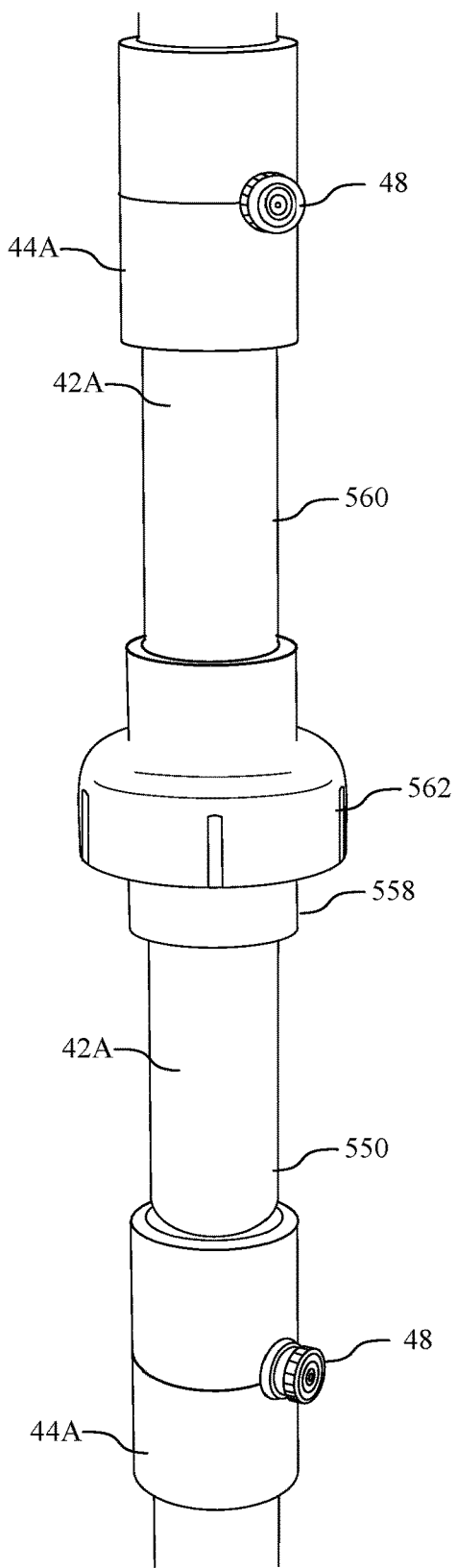
FIG. 33 depicts the connection of the upper-positioned close-ended misting pipe with the lower-positioned open-ended misting pipe of the mister kit of FIG. 29.

FIG. 33 depicts the connection of the closed-ended misting pipe 560 in its upper position with the lower-positioned close-ended misting pipe 550 of the mister kit 510 of FIG. 29.

Figure 34:
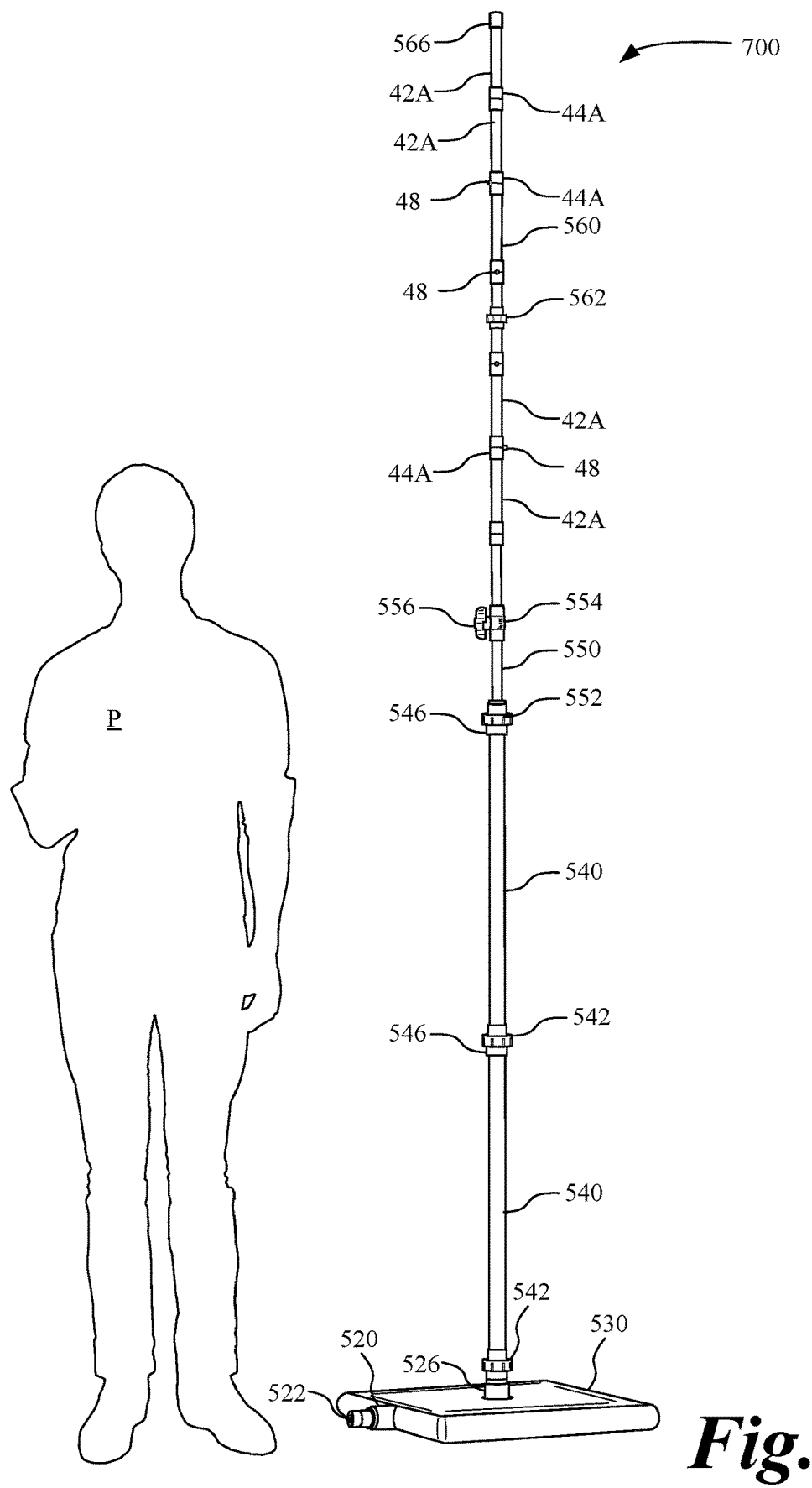
FIG. 34 depicts a substantially side and partial perspective view of the complete assembly of the components of the mister kit of FIG. 29.

FIG. 34 depicts a substantially side and partial perspective view of the complete mister assembly 700 of the components of the mister kit of FIG. 29. Adult size person P gives a relative scale of the height of the mister assembly 700.

In FIG. 34, the physical relationship and arrangement of components base 520, cover 530, water extension pipe 540, open-ended mister pipe 550, and closed-ended mister pipe 560 of the mister kit 510 along with their respective subcomponents including misters 48, mister tube 44A, mister extension 44A, valve 554, valve handle 556 as described for FIGS. 29 and 30 are illustrated.

In use, incoming water at the hose connector 522 is upwardly directed through the outlet connector 526 of the base 520, and then into the connecting water extension pipe 540 sealably secured to the outlet connector 526 via pipe 540's connector 546. Water is then upwardly routed to the upper-positioned pipe 540 that is secured to the lower-positioned pipe 540 via connector 542 sealably engagement with lower-positioned pipe 540's connector 546. Water flow 540 continues upward to the open-ended mister pipe 550 that is sealably engaged to the upward-positioned pipe helical connector 546 with mister pipe's 550 helical connector 542.

Valve handle 556 is shown turned to the "on" position allowing incoming water to be delivered in a pressurized condition for delivery to and through the misters 48 in the close-ended mister pipe 560 and the lower-located open-ended mister pipe 550. When the person P turns the valve handle 556 substantially ninety degrees to its closed or "off" position, valve 554 blocks incoming water and stops misting action through the misters 48 of the mister assembly 700.

Figure 35:
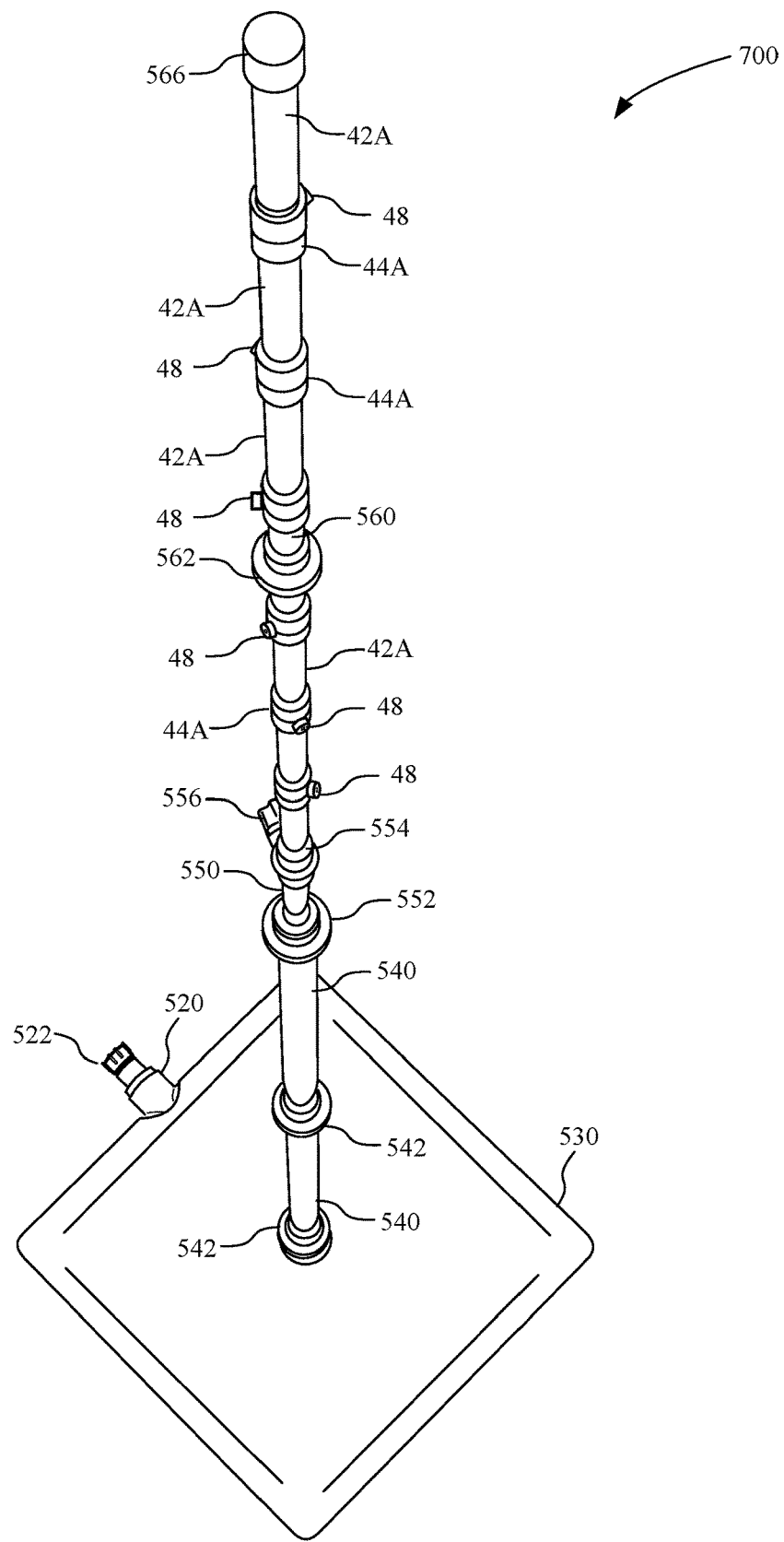
FIG. 35 depicts a substantially isometric view of the complete assembly of the components of the mister kit of FIG. 29.

FIG. 35 depicts a substantially isometric view of the complete mister assembly 700 of the components of the mister kit 510 of FIG. 29. Most of the components and subcomponents visible in this substantially isometric view are shown and function as described in FIGS. 29-34.

While the preferred embodiment of the invention has been illustrated and described, as noted above, many changes can be made without departing from the spirit and scope of the invention. For example, the custom assembled misters may be positioned in horizontal positions. Material used in the kit components includes plastics, rubber o-rings, and metal-based nozzles. Solid base 14A can be included in Mister Kit 10B and water fillable base 14B can be included in Mister Kit 10A. Water fillable base 14B can also be filled with liquids other than water and solid compositions that are pourable. Schedule 40 PVC polyvinyl chloride material can be substituted with clear or transparent plastic material so that water flow may be observed coursing through a given mister stand configuration. Mister Kits 10A and 10 B may also include water filter screens that adapt into hose connector 30.

I claim:

1. A method for adapting an umbrella stand by a user into a mister device comprising:
    sliding a hose connection component into a tube secured to a base;
    installing a series of nozzle tubes-extension tubes pairs in hydraulic communication with the hose connection component;
    blocking hydraulic communication at the last extension tube of the installed nozzle tube-extension tube series by affixing a mister cap to the last extension tube;
    and, depending on the length of the chain of nozzle tube-extension tube pairs, affixing at least one clamping stabilizer to at least one extension tube selected by the user for clamp grappling onto a pole of the umbrella stand.

2. The method of claim 1, wherein the nozzle tube includes at least two misters diametrically located to provide opposing directed mist bursts having substantially equal action-reaction forces.

* * * * *